(12) United States Patent
Kim et al.

(10) Patent No.: US 11,037,051 B2
(45) Date of Patent: Jun. 15, 2021

(54) 3D PLANE DETECTION AND RECONSTRUCTION USING A MONOCULAR IMAGE

(71) Applicant: NVIDIA Corporation, Santa Clara, CA (US)

(72) Inventors: Kihwan Kim, Campbell, CA (US); Jinwei Gu, San Jose, CA (US); Chen Liu, McLean, VA (US); Jan Kautz, Lexington, MA (US)

(73) Assignee: NVIDIA Corporation, Santa Clara, CA (US)

( * ) Notice: Subject to any disclaimer, the term of this patent is extended or adjusted under 35 U.S.C. 154(b) by 85 days.

(21) Appl. No.: 16/565,885

(22) Filed: Sep. 10, 2019

(65) Prior Publication Data

US 2020/0167943 A1 May 28, 2020

Related U.S. Application Data

(60) Provisional application No. 62/772,266, filed on Nov. 28, 2018.

(51) Int. Cl.
*G06N 3/04* (2006.01)
*G06T 7/11* (2017.01)
(Continued)

(52) U.S. Cl.
CPC ......... *G06N 3/0454* (2013.01); *G06K 9/6217* (2013.01); *G06K 9/6267* (2013.01); *G06T 7/11* (2017.01); *G06T 7/50* (2017.01)

(58) Field of Classification Search
None
See application file for complete search history.

(56) References Cited

U.S. PATENT DOCUMENTS

| 2017/0337690 A1* | 11/2017 | Arth | G06T 7/75 |
| 2018/0075602 A1* | 3/2018 | Shen | G06T 7/62 |
| 2019/0057532 A1* | 2/2019 | Marzban | G06T 7/536 |

OTHER PUBLICATIONS

Byeon, W., et al., "Scene labeling with lstm recurrent neural networks," In Proceedings of the IEEE Conference on Computer Vision and Pattern Recognition, pp. 3547-3555, 2015.
(Continued)

*Primary Examiner* — Justin P. Misleh
(74) *Attorney, Agent, or Firm* — Leydig, Voit & Mayer, Ltd.

(57) ABSTRACT

Planar regions in three-dimensional scenes offer important geometric cues in a variety of three-dimensional perception tasks such as scene understanding, scene reconstruction, and robot navigation. Image analysis to detect planar regions can be performed by a deep learning architecture that includes a number of neural networks configured to estimate parameters for the planar regions. The neural networks process an image to detect an arbitrary number of plane objects in the image. Each plane object is associated with a number of estimated parameters including bounding box parameters, plane normal parameters, and a segmentation mask. Global parameters for the image, including a depth map, can also be estimated by one of the neural networks. Then, a segmentation refinement network jointly optimizes (i.e., refines) the segmentation masks for each instance of the plane objects and combines the refined segmentation masks to generate an aggregate segmentation mask for the image.

24 Claims, 15 Drawing Sheets

(51) Int. Cl.
G06T 7/50 (2017.01)
G06K 9/62 (2006.01)

(56) References Cited

OTHER PUBLICATIONS

Chabot, F., et al., "Deep manta: A coarse-to-fine many-task network for join 2d and 3d vehicle analysis from monocular image," In Proceedings of the IEEE Conference on Computer Vision and Pattern Recognition (CVPR), pp. 2040-2049, 2017.
Chauve, A., et al., "Robust piecewise-planar 3d reconstruction and completion from large-scale unstructured point data," In 2010 IEEE Computer Society Conference on Computer Vision and Pattern Recognition, pp. 1261-1268, 2010.
Chen, L., et al., "Semantic image segmentation with deep convolutional nets and fully connected crfs," arXiv preprint arXiv:1412.7062, 2014.
Chen, X., et al., "Monocular 3d object detection for autonomous driving," In Proceedings of the IEEE Conference on Cmputer Vision and Pattern Recognition, pp. 2147-2156, 2016.
Dai, A., et al., "ScanNet: Richly-annotated 3D reconstructions of indoor scenes," In IEEE Conf. on Computer Vision and Pattern Recognition, 2017.
Deng, Z., et al., "Unsupervised object region proposals for rgb-d indoor scenes," Computer Vision and Image Understanding, 154:127-136, 2017.
Fidler, S., et al., "3d object detection and viewpoint estimation with a deformable 3d cuboid model," In Advances in neural information processing systems, pp. 611-619, 2012.
Gallup, D., et al., "Piecewise planar and non-planar stereo for urban scene reconstruction," 2010.
Geiger, A., et al., "Vision meets robotics: The kitti dataset, The International Journal of Robotics Research," 32(11):1231-1237, 2013.
He, K., et al., "Mask r-cnn," In Computer Vision (ICCV) 2017 IEEE International Conference on, pp. 2980-2988 IEEE 2017.
He, K., et al., "Delving deep into rectifiers: Surpassing human-level performance on imagenet classification," In Proceedings of the IEEE Conference on Computer Vision and Pattern Recognition (CVPR), pp. 1026-1034, 2015.
Hoiem, D., et al., "Automatic photo pop-up," ACM Trans.Graph. 24(3): 577-584, Jul. 2005.
Kaess, M., "Simultaneous localization and mapping with infinite planes," In Proceedings of the IEEE Conference on Robotics and Automation (ICRA), pp. 4605-4611, 2015.
Knapitsch, A., et al., "Tanks and temples: Benchmarking large-scale scene reconstruction," ACM Transactions on Graphics (ToG), 36(4):78, 2017.
Krahenbuhl, P., et al., "Efficient inference in fully connected crfs with Gaussian edge potentials," In Advances in neural information processing systems, pp. 109-117, 2011.
Kundu, A., et al., "3d-rcnn: Instance-level 3d object reconstruction via render-and-compare," In CVPR, 2018.
Li, C., et al., "Deep supervision with shape concepts for occlusion-waare 3d object parsing," arXiv preprint arXiv:1612.02699, 2016.
Liang, X., et al., "Semantic object parsing with local-global long short-term memory," In Proceedings of the IEEE Conference on Computer Vision and Pattern Recognition (CVPR), pp. 3185-3193, 2016.
Lin, G., et al., "Efficient piecewise training of deep structured models for semantic segmentation," In Proceedings of the IEEE Conference on Computer Vision and Pattern Recognition (CVPR), pp. 3194-3203, 2016.
Lin, TY., et al., "Feature pyramid networks for object detection," In Proceedings of the IEEE Conference on Computer Vision and Pattern Recognition (CVPR), vol. 1, p. 4, 2017.
Liu, C., et al., "Layered scene decomposition via the occlusion-crf," In Proceedings of the IEEE Conference on Computer Vision and Pattern Recognition (CVPR), pp. 165-173, 2016.
Liu, C., et al., "Planenet: Piece-wise planar reconstruction from a single rgb image," In Proceedings of the IEEE Conference on Computer Vision and Pattern Recognition (CVPR), pp. 2579-2588, 2018.
Liu, F., et al., "Learning depth from single monocular images using deep convolutional neural fields," IEEE Trans.PatternAnal.Mach.Intell., 38(10):2024-2039, 2016.
Liu, R., et al., "An intriguing failing of convolutional neural networks and the coordconv solution," arXiv preprint arXiv:1807.03247, 2018.
Liu, Z., et al., "Semantic image segmentation via deep parsing network," In Proceedings of the IEEE Conference on Computer Vision and Pattern Recognition (CVPR), pp. 1377-1385, 2015.
Mottaghi, R., et al., "A coarse-to-fine model for 3d pose estimation and sub-category recognition," In Proceedings of the IEEE Conference on Computer Vision and Pattern Recognition (CVPR), pp. 418-426, 2015.
Mousavian, A., et al., "3d bounding box estimation using deep learning and geometry," In Proceedings of the IEEE Conference on Computer Vision and Pattern Recognition (CVPR), pp. 5632-5640, 2017.
Ronneberger, O., et al., "Convolutional Networks for biomedical image segmentation," In International Conference on Medical image computing and computer-assisted intervention, pp. 234-241, Springer, 2015.
Ros, G., et al., "The synthia dataset: A large collection of synthetic images for semantic segmentation of urban scenes," In Proceedings of the IEEE Conference on Computer Vision and Pattern Recognition (CVPR), pp. 3234-3243, 2016.
Shotton, J., et al., "Scene coordinate regression forests for camera relocalization in rgb-d images," In Proceedings of the IEEE Conference on Computer Vision and Pattern Recognition (CVPR), pp. 2930-2937, 2013.
Shuai, B., et al., "Dag-recurrent neural networks for scene labeling," In Proceedings of the IEEE Conference on Computer Vision and Pattern Recognition (CVPR), pp. 3620-3629, 2016.
Silberman, N., et al., "Indoor segmentation and support inference from rgbd images," In European Conference on Computer Vision, pp. 746-760, Springer, 2012.
Sinha, S., et al., "Piecewise planar stereo for image-based rendering," In Proceedings of the IEEE Conference on Computer Vision and Pattern Recognition (CVPR), 2009.
Sun, M., et al., "Relating things and stuff via objectproperty interactions," IEEE transactions on pattern analysis and machine intelligence, 36(7):1370-1383, 2014.
Tighe J., et al., "Finding things: Image parsing with regions and per-exemplar detectors," In Proceedings of the IEEE Conference on Computer Vision and Pattern Recognition (CVPR), pp. 3001-3008, 2013.
Tighe, J., et al., "Scene parsing with object instances and occlusion ordering," In Proceedings of the IEEE Conference on Computer Vision and Pattern Recognition (CVPR), pp. 3748-3755, 2014.
Tsai, G., et al., "Real-time indoor scene understanding using Bayesian filtering with motion cues," In International Conference on Computer Vision, pp. 121-128, 2011.
Tu, Z., et al., "Image parsing: Unifying segmentation, detection, and recognition," International Journal of Computer Vision, 63(2):113-140, 2005.
Tulsiani, S., et al., "Layer-structured 3d scene inference via view synthesis," arXiv preprint arXiv:1807.10264, 2018.
Wang, X., et al., "Designing deep networks for surface normal estimation," In Proceedings of the IEEE Conference on Computer Vision and Pattern Recognition (CVPR), pp. 539-547, 2015.
Wang, X., et al., "Non-local neural networks," In Proceedings of the IEEE Conference on Computer Vision and Pattern Recognition (CVPR), 2018.
Wu, J., et al., "Single image 3d interpreter network," In European Conference on Computer Vision, pp. 365-382, Springer 2016.
Xiang, Y., et al., "Data-driven 3d voxel patterns for object category recognition," In Proceedings of the IEEE Conference on Computer Vision and Pattern Recognition (CVPR), pp. 1903-1911, 2015.

(56) References Cited

OTHER PUBLICATIONS

Yang, F., et al., "Recovering 3d planes from a single image via convolutional neural networks," In Proceedings of the IEEE Conference on Computer Vision and Pattern Recognition (CVPR), pp. 85-100, 2018.

Yao, J., et al., "Describing the scene as a whole: Joint object detection, scene classification and semantic segmentation," In Proceedings of the IEEE Conference on Computer Vision and Pattern Recognition (CVPR), pp. 702-709, 2012.

Yu, F., et al., "Multi-scale context aggregation by dilated convolutions," arXiv preprint arXiv:1511.07122, 2015.

Zebedin, L., et al., "Fusion of feature-and area-based information for urban buildings modeling from aerial imagery," In European conference on computer vision, pp. 873-886, Springer 2008.

Zhang, R., et al., "Global-residual and local-boundary refinement networks for rectifying scene parsing predictions," In Proceedings of the 26$^{th}$ International Joint Conference on Artificial Intelligence, pp. 3427-3433, AAAI Press, 2017.

Zhao, H., et al., "Pyramid scene parsing network," In Proceedings of the IEEE Conference on Computer Vision and Pattern Recognition (CVPR), pp. 2881-2890, 2017.

Zheng, S., et al., "Conditional random fields as recurrent neural networks," In Proceedings of the IEEE Conference on Computer Vision and Pattern Recognition (CVPR), pp. 1529-1537, 2015.

Zia, M.Z., et al., "Detailed 3d representations for object recognition and modeling," IEEE transactions on pattern analysis and machine intelligence, 35(11):2608-2623, 2013.

Y. Furukawa, B. Curless, S. M. Seitz and R. Szeliski, "Manhattan-world stereo," 2009 IEEE Conference on Computer Vision and Pattern Recognition, Miami, FL, USA, 2009, pp. 1422-1429, doi: 10.1109/CVPR.2009.5206867.

J. Zhou and B. Li, "Robust Ground Plane Detection with Normalized Homography in Monocular Sequences from a Robert Platform," 2006 International Conference on Image Processing, Atlanta, GA, USA, 2006, pp. 3017-3020, doi: 10.1109/ICIP.2006.312972.

Zhou, J. et al., "Homography-based ground detection for a mobile robot platform using a single camera," In Proceedings of the IEEE International Conference on Robotics and Automation, ICRA, pp. 4100-4105, 2006.

He, K., et al., "Deep Residual Learning for Image Recognition," Computer Vision and Pattern Recognition, Dec. 10, 2015.

* cited by examiner

3D PLANE DETECTION AND RECONSTRUCTION USING A MONOCULAR IMAGE

CROSS-REFERENCE TO RELATED APPLICATIONS

This application claims the benefit of U.S. Provisional Application No. 62/772,266 titled "Detecting Three-Dimensional Planes from a Single Color Image", filed Nov. 28, 2018, the entire contents of which is incorporated herein by reference.

TECHNICAL FIELD

The present disclosure relates to data processing. More specifically, the present disclosure relates to detecting planes in two-dimensional (2D) images.

BACKGROUND

Detecting planar regions in an image and estimating parameters of three-dimensional (3D) planes provides important information for understanding a structure and context of a scene. For example, such information is important for robotic navigation applications that utilize input from an image sensor. However, the task of detecting planes or estimating parameters of the planes is fundamentally challenging as estimation from a single 2D image is an ill-posed problem. First, 3D plane reconstruction requires rich scene priors. Second, planar structures often lack texture, requiring global understanding of image semantics as opposed to local texture analysis. Recent approaches to this task have utilized Convolutional Neural Networks (CNNs), formulating the task as a plane segmentation task. However, these approaches suffer from some limitations such as: (1) missing small surfaces; (2) requiring a maximum number of planes in a single image, a priori; and (3) poor generalization across domains. Therefore, there is a need for addressing these issues and/or other issues associated with the prior art.

SUMMARY

Plane detection in an image captured using a monocular image sensor is performed by a system that implements a number of components utilizing neural networks. The system can include a plane detection network, a segmentation refinement network, and (optionally) a warping loss module to improve temporal consistency during training. Plane detection is performed by detecting plane objects in an image, generating separate segmentation masks for each plane object, followed by a subsequent processing step to jointly optimize the segmentation masks.

In some embodiments, a system is disclosed for detecting three-dimensional (3D) planes from monocular, two-dimensional (2D) images. The system includes a feature pyramid network configured to generate a pyramid of feature maps for an input image and one or more neural networks configured to process regions of interest sampled from the pyramid of feature maps to identify a number of plane objects in the input image. The one or more neural networks are configured to estimate parameters for each plane object in the number of plane objects. The parameters include bounding box parameters, plane normal parameters, and a segmentation mask. In some embodiments, the parameters can also include a depth map.

In some embodiments, the pyramid of feature maps includes a number of levels associated with a number of different scales. The bounding box parameters define a bounding box that indicates a location of the plane object, and the plane normal parameters indicate a relative orientation of the plane object.

In some embodiments, a plane offset parameter for each plane object in the number of plane objects is calculated based on a normal vector estimated for each plane object and a global depth map. In an embodiment, a decoder network included in the one or more neural networks is configured to process the pyramid of feature maps to estimate the global depth map.

In some embodiments, the one or more neural networks includes a regressor network configured to estimate the bounding box parameters for at least one plane object associated with a region of interest within a particular feature map associated with a particular level of the pyramid of feature maps. In an embodiment, the regressor network is further configured to estimate the plane normal parameters for the at least one plane object associated with the region of interest.

In some embodiments, the one or more neural networks includes a convolutional neural network configured to process the region of interest to generate the segmentation mask for each plane object included in the number of plane objects.

In some embodiments, a segmentation refinement network configured to generate a refined segmentation mask for the input image based on the segmentation mask for each plane object included in the number of plane objects, wherein an input to at least one layer of the segmentation refinement network includes a feature map associated with a particular plane object and a mean feature map calculated based on an element-wise average of the feature maps for each of the other plane objects in the number of plane objects.

In some embodiments, at least one of the feature pyramid network or the one or more networks are implemented on a parallel processing unit.

In some embodiments, a warping loss module is configured to adjust attributes of the one or more neural networks by comparing a reconstructed 3D coordinate map for the input image with a warped 3D coordinate map for a neighbor image.

In some embodiments, a method is disclosed for detecting planar objects in an image. The method includes the steps of generating, via a feature pyramid network, a pyramid of feature maps based on an input image and processing, via one or more neural networks, regions of interest sampled from the pyramid of feature maps to identify a number of plane objects in the input image. The one or more neural networks are configured to estimate parameters for each plane object in the number of plane objects. The parameters include bounding box parameters, plane normal parameters, and a segmentation mask. In some embodiments, the parameters can also include a depth map.

In some embodiments, a system is disclosed to implement a neural network framework, where at least one processing unit is configured to implement the neural networks. The neural network framework includes a feature pyramid network, a regressor network, a convolutional neural network, and a decoder network. The feature pyramid network is configured to process an image to generate a plurality of feature maps associated with the image and generate samples for a plurality of regions of interest from the plurality of feature maps. The plurality of feature maps includes at least two feature maps having different resolutions, in a pixel space. The regressor network is configured to process the samples for each region of interest to identify zero or more plane objects in each region. The regressor network is also configured to estimate bounding box parameters and plane normal parameters for each plane object in the zero or more plane objects. The convolutional neural network is configured to estimate a segmentation map for each plane object identified by the regressor network. The decoder network configured to estimate a depth map corresponding to the image based on the plurality of feature maps.

DETAILED DESCRIPTION

Figure 1:
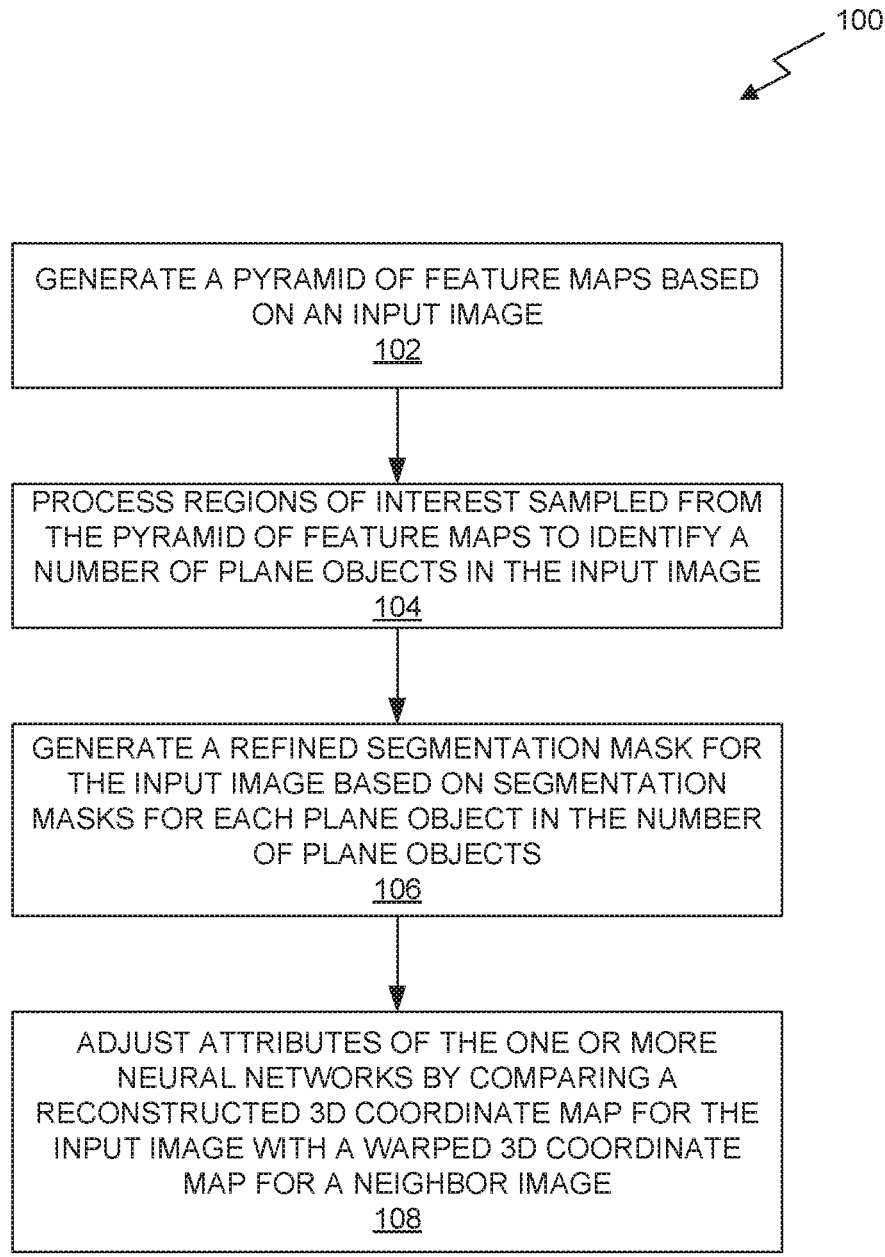
FIG. 1 illustrates a flowchart of a method for detecting planar regions in an image, in accordance with some embodiments.

A solution to the plane parameter estimation problem is proposed that builds upon a CNN architecture. The architecture described herein includes three components: (1) a plane detection network; (2) a segmentation refinement network; and (3) a warping-loss module, which is used exclusively during training of the plane detection network and/or the segmentation refinement network.

In one embodiment, the plane detection network receives an input image and identifies an arbitrary number of plane objects in the image. As used herein, a plane object refers to a portion of the input image that the plane detection network identifies as including a surface associated with a surface normal vector or other plane parameters. For example, a plane object can refer to a flat or relatively flat surface of a desk or wall. In other words, the portion of the image in 2D space can be modeled as a portion of a plane in 3D space.

For each plane object, a bounding box, a segmentation mask, and a normal vector for the plane object are estimated by the plane detection network. In addition, a global depth map is generated for the image. A plane offset value corresponding to each plane object can then be calculated using the depth map and the estimated normal vector. It will be appreciated that the plane detection network generates a different segmentation mask for each plane object rather than a single segmentation mask for the image or multiple segmentation masks for different portions of the image containing one or more plane objects. Consequently, the segmentation masks corresponding to individual plane objects are likely to have a better level of granularity than compared with prior art techniques.

In some embodiments, the plane detection network comprises a region proposal network (RPN). In a first section of the RPN, the input image is processed by a feature pyramid network (FPN) to generate feature maps for the image at different scales. In a second section of the RPN, the feature maps are sampled to generate regions of interest and a number of plane objects can be identified in each region of interest, with predictor heads configured to extract the bounding box parameters, segmentation masks, and normal vectors for each plane object in the number of plane objects. The predictor heads refer to one or more neural networks that further process the feature maps for the regions of interest or the pyramid of feature maps generated by the FPN.

In some embodiments, a fixed pool of anchor regions is defined relative to a sliding window. An anchor region refers to a fixed aspect ratio and size of a region relative to the sliding window. The sliding window is then moved over the feature maps for the image at each scale, computing a fixed-size feature vector for each of the region of interest associated with the current sliding window location. The fixed-size feature vector for each region of interest is further processed by a regression network that is configured to estimate coordinates for a bounding box for a plane object within a number of anchor regions associated with the sliding window. The fixed-size feature vector for each region of interest is also processed, in parallel, by a CNN to generate a segmentation mask for each of the anchor regions. The segmentation mask refers to a binary mask that indicates whether each pixel of the anchor region is "planar" or "non-planar."

In addition, a second regression network is configured to estimate a normal vector (e.g., an orientation) for the plane object. In one embodiment, the second regression network is configured to classify the proposed plane object as one of k anchor normals (e.g., k=7). In one embodiment, a k-means clustering algorithm applied to the plane normal parameters from a set of ground-truth training images is used to identify the k anchor normals. In one embodiment, the anchor normals refer, roughly, to an upward-facing, downward-facing, and a number of horizontal vectors (e.g., 5 vectors) spaced at roughly 45 degrees.

In addition, a global depth map is estimated for the image. While local image analysis suffices for normal vector estimation of a plane object, global image analysis is crucial for providing context to the depth map inference. Therefore, a decoder network is appended to the output of the FPN (feature pyramid network) included in the first section of the RPN. Each stage of the decoder network includes a 3×3 convolution layer with stride 1 and a 4×4 deconvolution layer with stride 2. Bilinear up-sampling is used to generate a depth map in the same resolution as the input image. In one embodiment, a plane offset parameter, d, is then estimated for each plane object based on intrinsic camera parameters, the estimated normal vector for the plane object, n, and the estimated depth map.

In one embodiment, the segmentation refinement network jointly optimizes the segmentation masks computed for the different plane objects. Importantly, the number of plane objects detected by the plane detection network varies, so a simple solution of concatenating all of the segmentation masks, using padded zeros for missing planes, does not typically produce desired results. In one embodiment, each segmentation mask is represented in the entire image window and processed by a CNN. For each segmentation mask corresponding to a plane object, the feature maps produced by the CNN for the segmentation mask are concatenated with mean feature maps for all other segmentation masks for the other plane objects before being passed to a second CNN, which produces a refined mask for the plane object. The refined masks for all plane objects are then combined to generate a refined segmentation mask for the image that identifies a number of plane objects in the image.

In one embodiment, the warping-loss module is implemented to enforce consistency of reconstructed 3D planes with nearby views during training. For example, images processed by the plane detection network and the segmentation refinement network will typically be captured by a camera as a sequence of image frames. The output for a current frame can be compared to a warped output for a neighbor frame, during training, to ensure that the output of the refined segmentation masks do not diverge from frame to frame. Intrinsic camera information can be used to convert depth maps produced by the plane detection network to 3D coordinate maps. The L2 norm of the distance between a warped 3D coordinate from the current frame and a corresponding 3D coordinate from the neighboring frame are used as the loss function for training.

In some embodiment, each of the portions of the neural networks described above can be implemented on a processor, such as a central processing unit (CPU), graphics processing unit (GPU), or the like.

FIG. 1 illustrates a flowchart of a method 100 for detecting planar regions in an image, in accordance with some embodiments. Although method 100 is described in the context of a processing unit, the method 100 may also be performed by a program, custom circuitry, or by a combination of custom circuitry and a program. For example, the method 100 may be executed by a GPU (graphics processing unit), CPU (central processing unit), or any processor capable of implementing at least a portion of the neural networks described in more detail below. Furthermore, persons of ordinary skill in the art will understand that any system that performs method 100 is within the scope and spirit of embodiments of the present disclosure.

At step 102, a pyramid of feature maps is generated based on an input image. The input image can be a single image frame with one or more channels (e.g., RGB, monochromatic, etc.). In an embodiment, a feature pyramid network is implemented to process the input image and generate a pyramid of feature maps. As used herein, the pyramid of feature maps refers to a plurality of feature maps at different scales relative to a scale of the input image. The pyramid of feature maps can comprise a number of levels, with each level including one or more feature maps at a particular scale, with the scale (e.g., resolution in a pixel space) increasing when moving from the top to the bottom of the pyramid. In an embodiment, the feature pyramid network is based on a residual network that extracts features of the image. The feature map is then up-sampled and combined with intermediate feature maps from the residual network in order to generate the pyramid of feature maps.

At 104, regions of interest sampled from the pyramid of feature maps are processed to identify a number of plane object in the input image. In an embodiment, a sliding window is applied to each of the feature maps in the pyramid of feature maps to sample regions of interest. A region of interest can refer to a region of a feature map that corresponds to a particular subset of the input image. While the sliding window can have a fixed size, as applied to a particular feature map at a given scale in the pyramid of feature maps, the region of interest is associated with a variable sized region of the input image. For example, the sliding window can be defined as a 7×7 pixel region relative to a down-sampled size of a particular feature map in the pyramid of feature maps. The 7×7 pixel region in the feature map can corresponds to, e.g., a 14×14 pixel region, a 28×28 pixel region, or a 56×56 pixel region (or larger) in the input image based on the relative difference in scale, in pixel space, of the feature map(s) and the input image.

In an embodiment, the plane detection network can process each region of interest to identify zero or more plane objects within the region of interest. Each region of interest can be associated with a number of anchor regions, and one or more neural networks (e.g., predictor heads) can be defined to analyze the anchor regions to estimate bounding box parameters, plane normal parameters (e.g., normal vectors, residual vectors, etc.), and segmentation masks for a plane object associated with each anchor region. In addition, another neural network can be configured to estimate a global depth map for the image.

At 106, a refined segmentation mask is generated for the input image based on segmentation masks for each plane object in the number of plane objects. In an embodiment, each plane object detected by the plane detection network is associated with a corresponding segmentation mask for that plane object. The segmentation mask can be a binary mask that associates each pixel in a portion of the image or a portion of the region of interest as being either a part of the plane object or a part of the background of the image. As used herein, the background can refer to either non-planar objects or other plane objects in addition to the current plane object.

A segmentation refinement network can be configured to jointly optimize the collection of segmentation masks for each of the plane objects to generate a set of refined segmentation masks. In other words, each segmentation mask estimated by one of the predictor heads in the plane detection network is refined based on all of the other segmentation masks estimated by the predictor head. The refined segmentation masks for the plane objects are then combined to generate a refined segmentation mask for the input image.

In some embodiments, the refined segmentation mask can be used to generate a 3D model represented by the input image. The 3D model can include a number of points (e.g., 3-vector coordinates) representing the location of surfaces of objects visible in the input image. The points can also be associated with a color value or other metadata defined for the model.

At 108, the attributes of the one or more neural networks are adjusted by comparing a reconstructed 3D coordinate map for the input image with a warped 3D coordinate map for a neighbor image. In one embodiment, a warping loss module is configured to enforce consistency in the output of 3D coordinate maps over multiple image frames in a sequence of image frames. The warping loss module is used during training in order to adjust the attributes (e.g., weights, biases, etc.) of the one or more neural networks described in the segmentation refinement network or the plane detection network.

In an embodiment, a nearby view is defined as an image frame a number of frames (e.g., 20 frames) ahead of a current image frame in a sequence of images. The warping loss module compares a 3D coordinate map generated for the nearby view using a refined segmentation mask for the nearby view with a 3D coordinate map generated for the current frame using a refined segmentation mask for the current frame. An L1 loss function generates a loss value used to adjust the attributes of the neural networks in an end-to-end fashion using back-propagation.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 2:
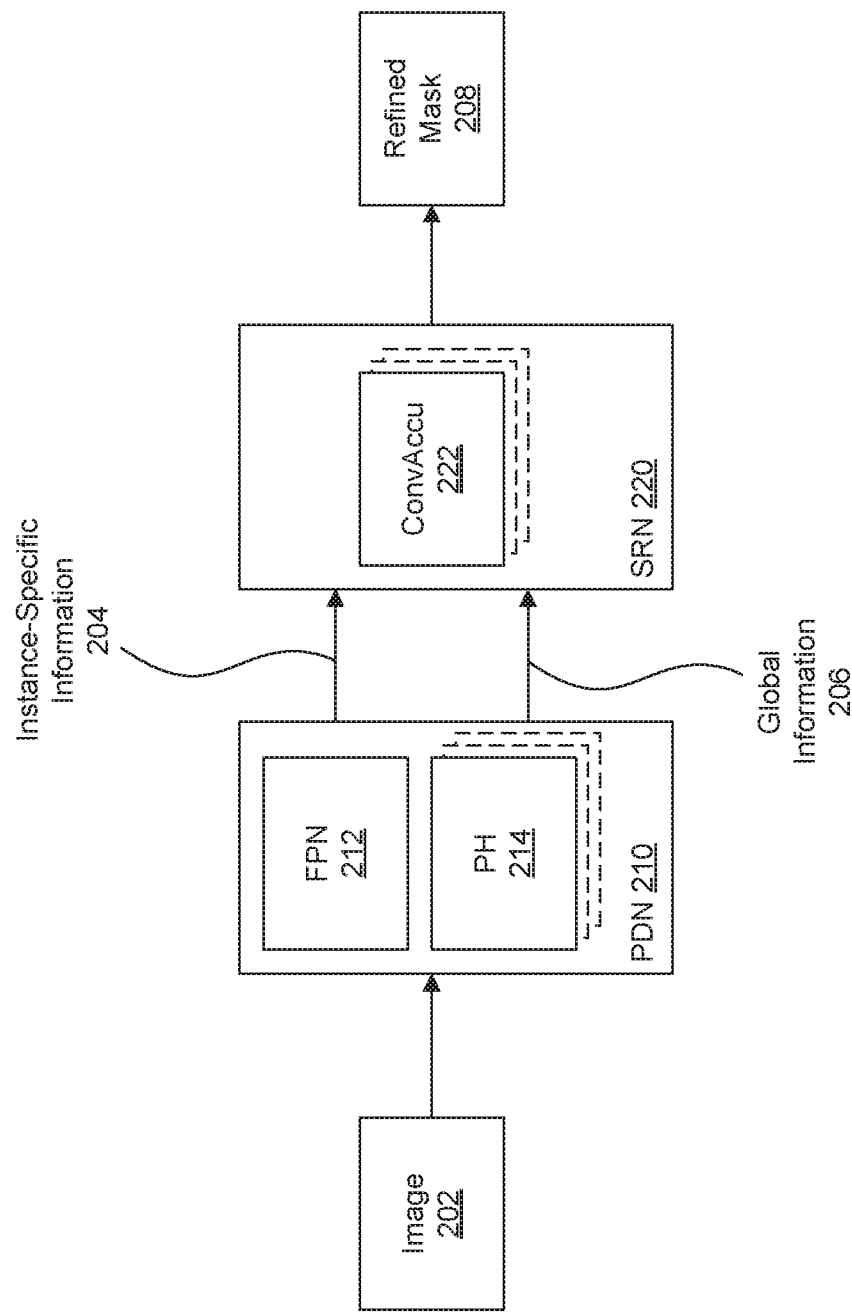
FIG. 2 illustrates a system for detecting planar regions in an image, in accordance with some embodiments.

FIG. 2 illustrates a system 200 for detecting planar regions in an image, in accordance with some embodiments. The system 200 includes a plane detection network (PDN) 210 and a segmentation refinement network 220. The PDN 210 receives an input image 202 and processes the input image 202 with a feature pyramid network (FPN) 212 and one or more predictor heads 214. The FPN 212 processes the image via a deep neural network (e.g., a deep residual network) to generate a pyramid of feature maps. The pyramid of feature maps are then sampled to generate regions of interest that are processed by the one or more predictor heads 214 to generate instance-specific information 204. The pyramid of feature maps can also be processed by at least a subset of the predictor heads 214 to generate global information 206.

In an embodiment, the instance-specific information 204 includes parameters for a plurality of plane objects. The parameters can include bounding box parameters that specify extents of a plane object. The parameters can also include a binary segmentation mask, a normal vector, and a classification for the object. In an embodiment, the normal vector can be specified as a residual vector that indicates a difference between the normal vector for the plane object and one of a plurality of fixed anchor normal defined by the plane detection network 210.

In an embodiment, the global information 206 can include a depth map for the input image, the original input image, and/or one or more feature maps included in the pyramid of feature maps generated by the FPN 212.

The SRN 220 processes the instance-specific information 204 for a plurality of plane objects detected by the PDN 210 as well as the global information 206 to generate a refined segmentation mask 208. In an embodiment, the SRN 220 implements a convolution accumulate (ConvAccu) module 222 that combines a U-Net with the idea of a non-local module to jointly optimize the per-instance segmentation masks in the instance-specific information 204 prior to combining the refined per-instance segmentation masks into a refined segmentation mask 208 for the input image.

Although not shown explicitly, the system 200 can be trained, in end-to-end fashion, utilizing a warping loss module that calculates a loss function based on reconstructed 3D models for a pair of image frames. The warping loss module is not used during inference of the refined segmentation mask for a particular image frame after training is complete and, therefore, is omitted from FIG. 2. The warping loss module, in accordance with one embodiment, is described in more detail below.

It will be appreciated that the PDN 210 and/or the SRN 220, or portions thereof, can be implemented by a processor configured to execute instructions. Neural networks are often well-suited to be implemented on specialized processing hardware such as a parallel processing unit. A more completion description of an exemplary parallel processing unit configured to implement at least a portion of the neural networks in system 200 is described below.

Parallel Processing Architecture

Figure 3:
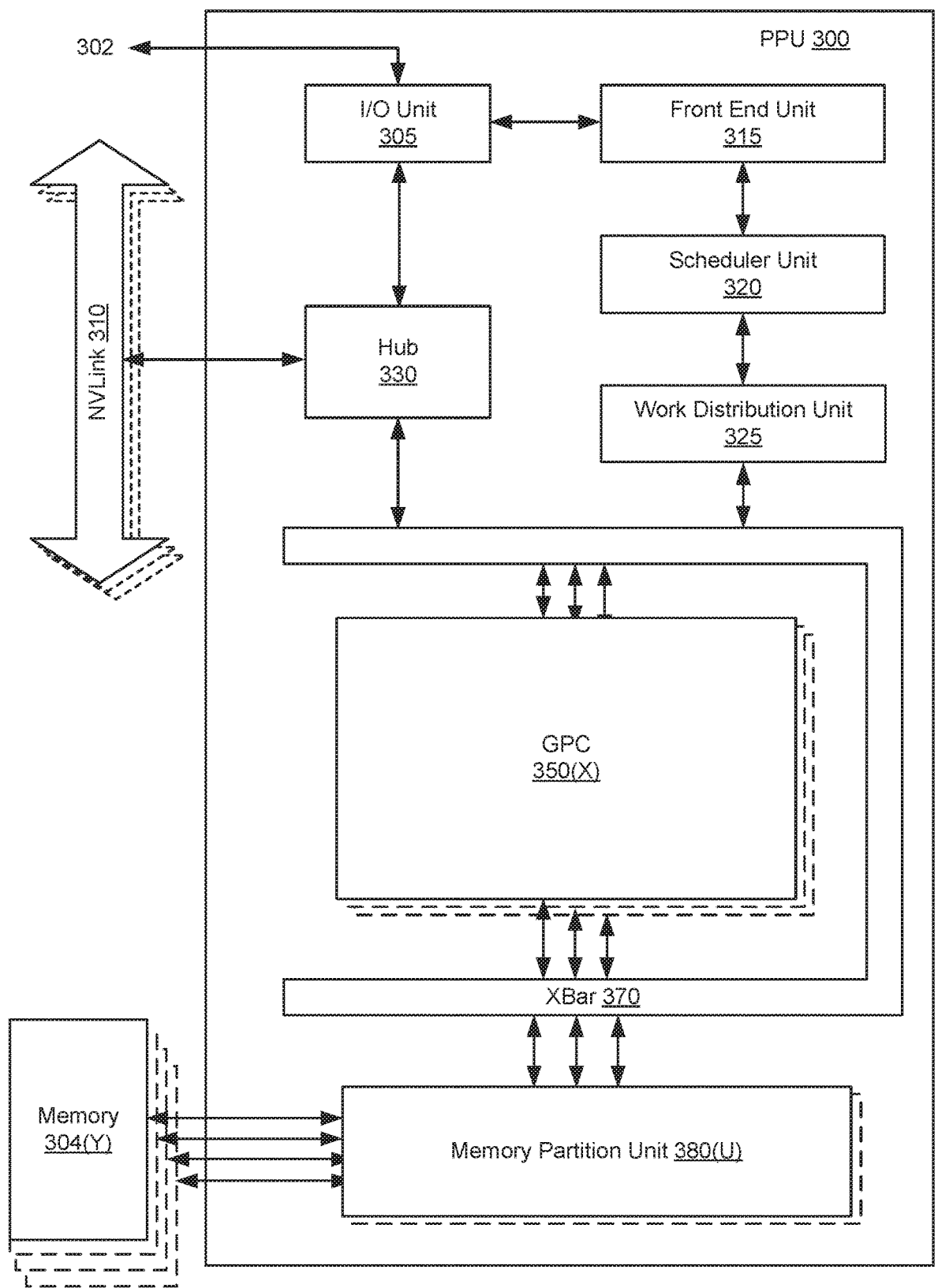
FIG. 3 illustrates a parallel processing unit, in accordance with an embodiment.

FIG. 3 illustrates a parallel processing unit (PPU) 300, in accordance with some embodiments. The PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including: autonomous vehicle platforms; deep learning; high-accuracy speech, image, and text recognition systems; intelligent video analytics; molecular simulations; drug discovery; disease diagnosis; weather forecasting; big data analytics; astronomy; molecular dynamics simulation; financial modeling; robotics; factory automation; real-time language translation; online search optimizations; personalized user recommendations; and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more memory partition units 380. The PPU 300 may be connected to a host processor or other PPUs 300 via one or more high-speed NVLink 310 interconnects. The PPU 300 may also be connected to a host processor or other peripheral devices via an interconnect 302. The PPU 300 may also be connected to a local memory comprising a number of memory devices 304. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units (not explicitly shown) of the PPU 300 such as one or more copy engines, a video encoder, a video decoder, a power management unit, etc. The NVLink 310 is described in more detail in conjunction with FIG. 5B.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units (not explicitly shown) of the PPU 300 such as one or more copy engines, a video encoder, a video decoder, a power management unit, etc. In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the memory partition units 380, which implement a memory interface for reading and writing data to/from the memory 304. The results can be transmitted to another PPU 304 or CPU via the NVLink 310. In an embodiment, the PPU 300 includes a number U of memory partition units 380 that is equal to the number of separate and distinct memory devices 304 coupled to the PPU 300. A memory partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
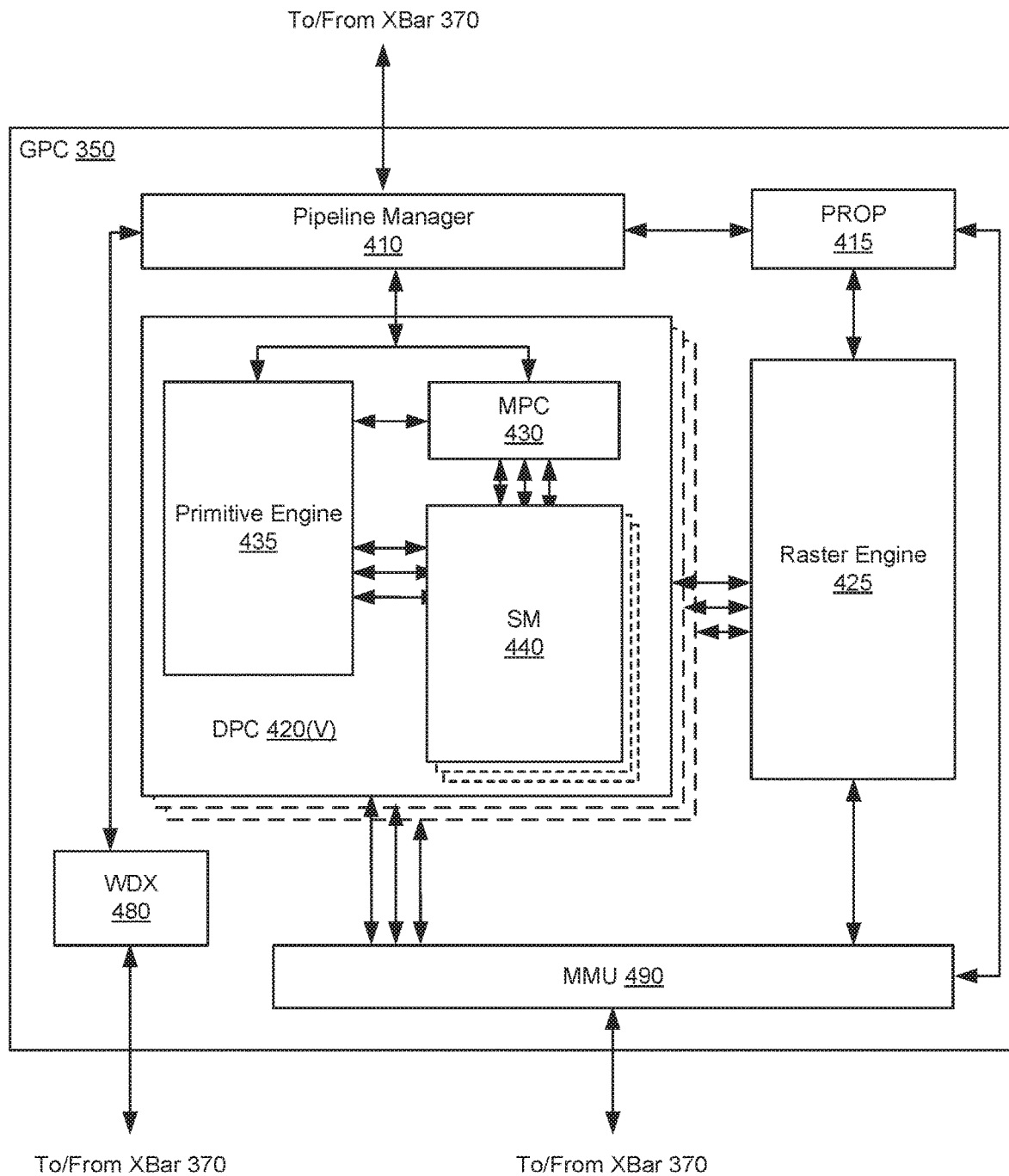
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
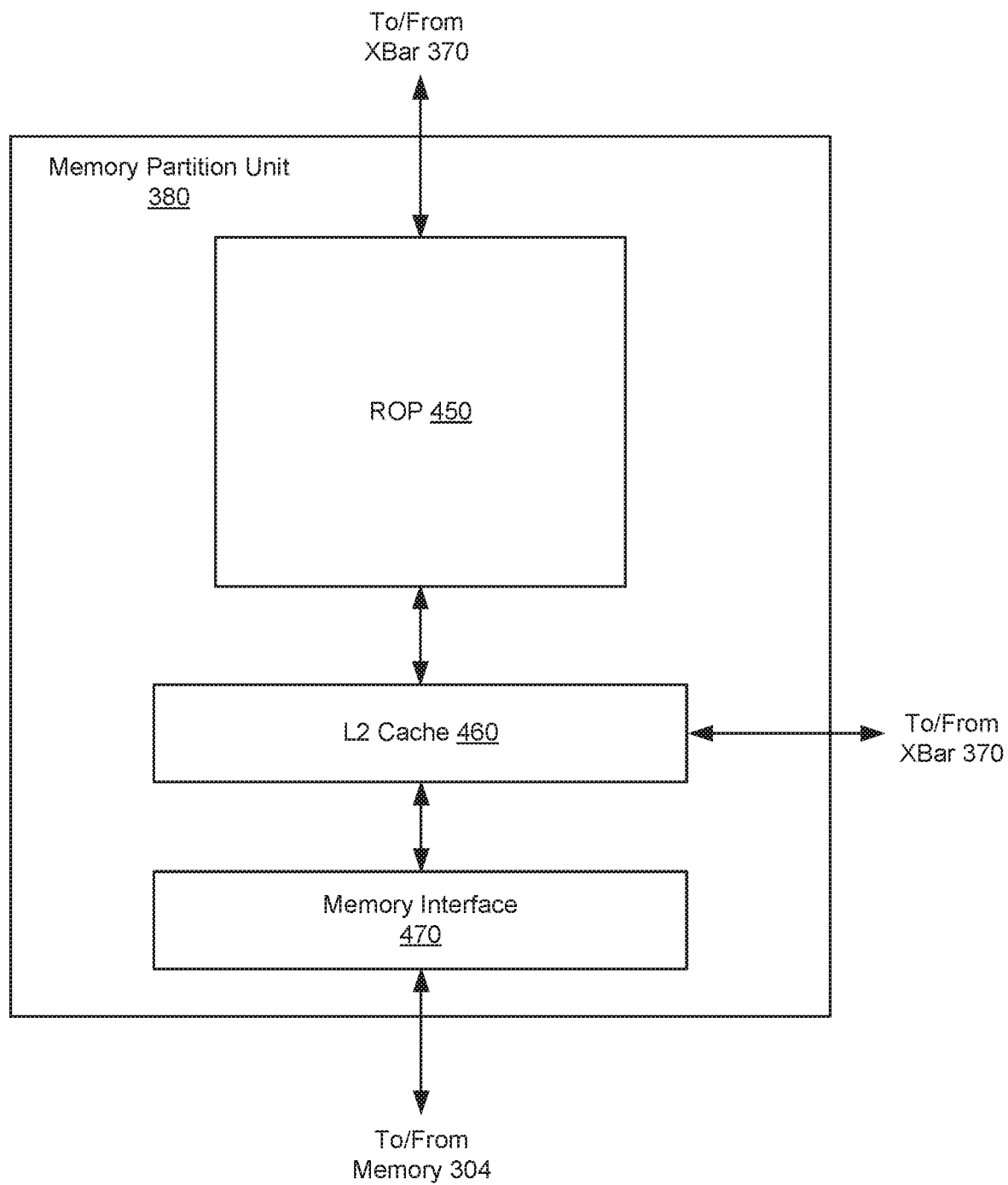
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the memory partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32-bit, 64-bit, 128-bit, 1024-bit data buses, or the like, for high-speed data transfer. In an embodiment, the PPU 300 incorporates Y memory interfaces 470, one memory interface 470 per pair of memory partition units 380, where each pair of memory partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In some embodiments, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment, the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In some embodiments, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of memory partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiments, the ROP unit 450 may be outside of the memory partition unit 380. For example, the ROP unit 450 may reside in the GPC 350 or another unit.

Figure 5A:
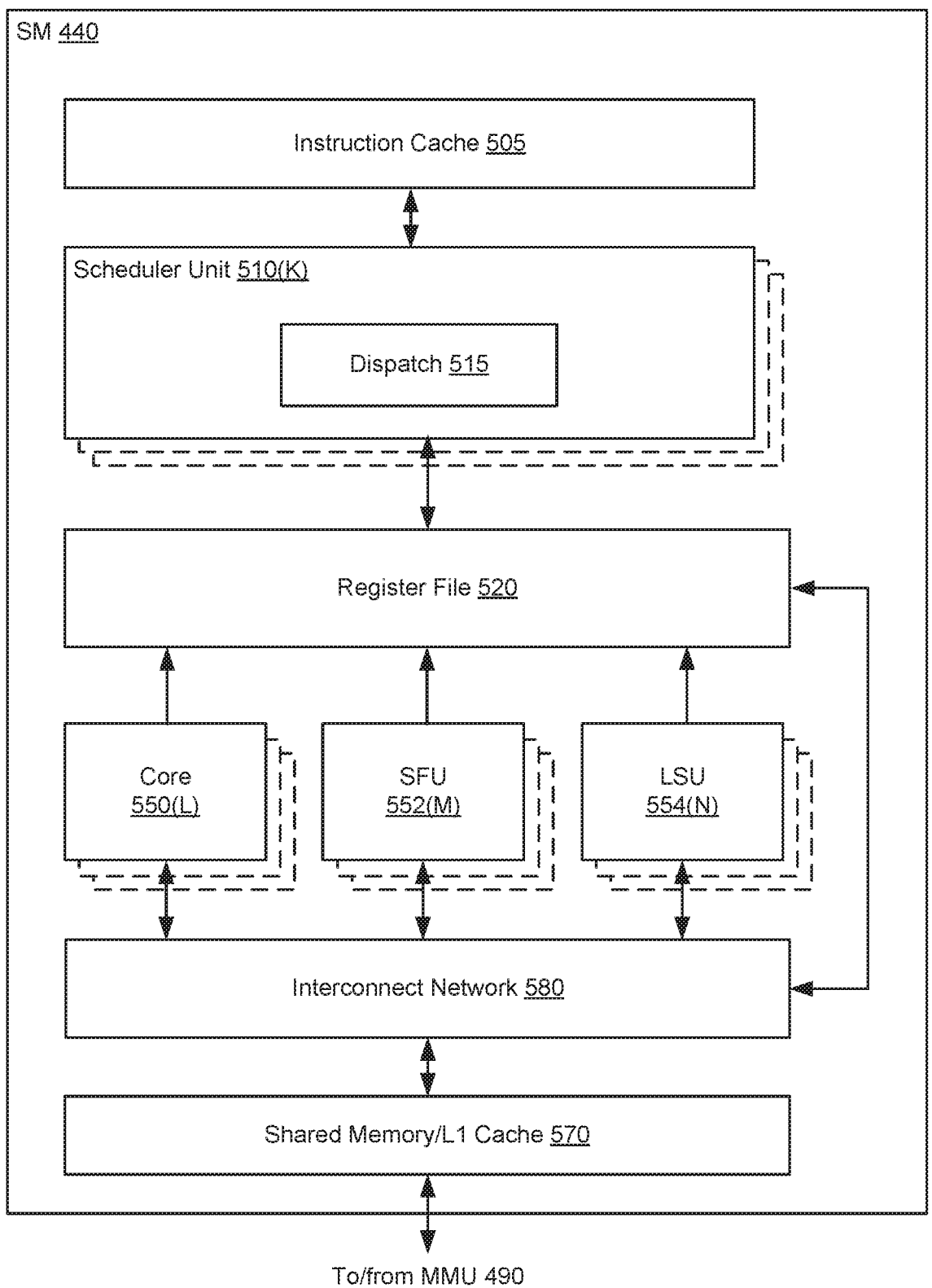
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, and a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (e.g., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores are configured to perform matrix operations, and, in some embodiments, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as the CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In some embodiments, the SFUs 552 may include one or more texture units configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 570. The texture units implement texture operations such as filtering operations using mip-maps (e.g., texture maps of varying levels of detail). In an embodiment, each SM 340 includes two texture units.

Each SM 440 also comprises NLSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 as well as between threads in the SM 440. In an embodiment, the shared memory/L1 cache 570 comprises 128 KB of storage capacity and is in the path from the SM 440 to the memory partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity as a cache. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, using the shared memory/L1 cache 570 to communicate between threads, and using the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 204, a reduced instruction set computer (RISC) CPU, a memory management unit (MMU), a digital-to-analog converter (DAC), and the like.

In an embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
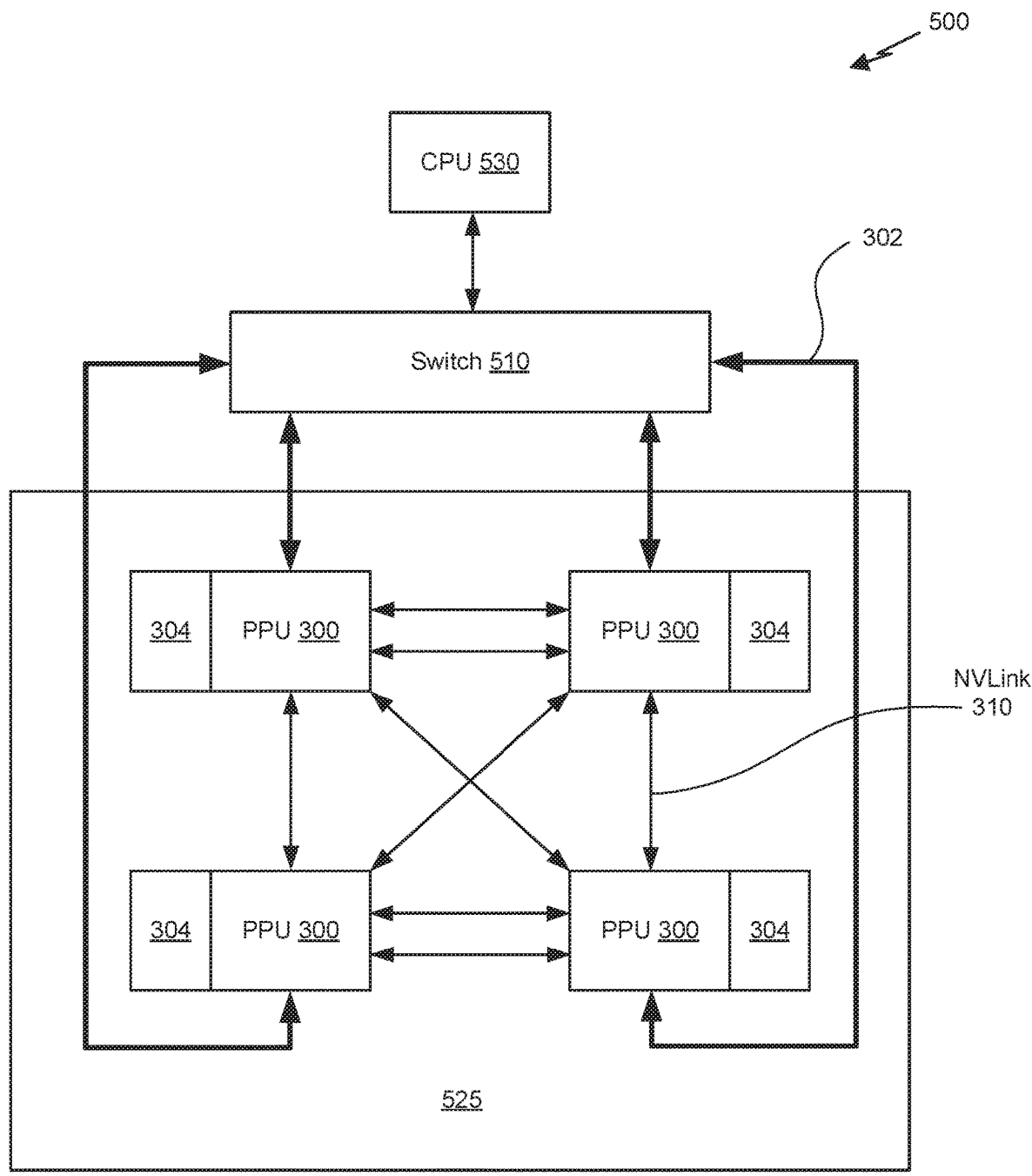
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The exemplary system 565 may be configured to implement the method 100 shown in FIG. 1. The processing system 500 includes a CPU 530, a switch 510, and multiple PPUs 300 each coupled to respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
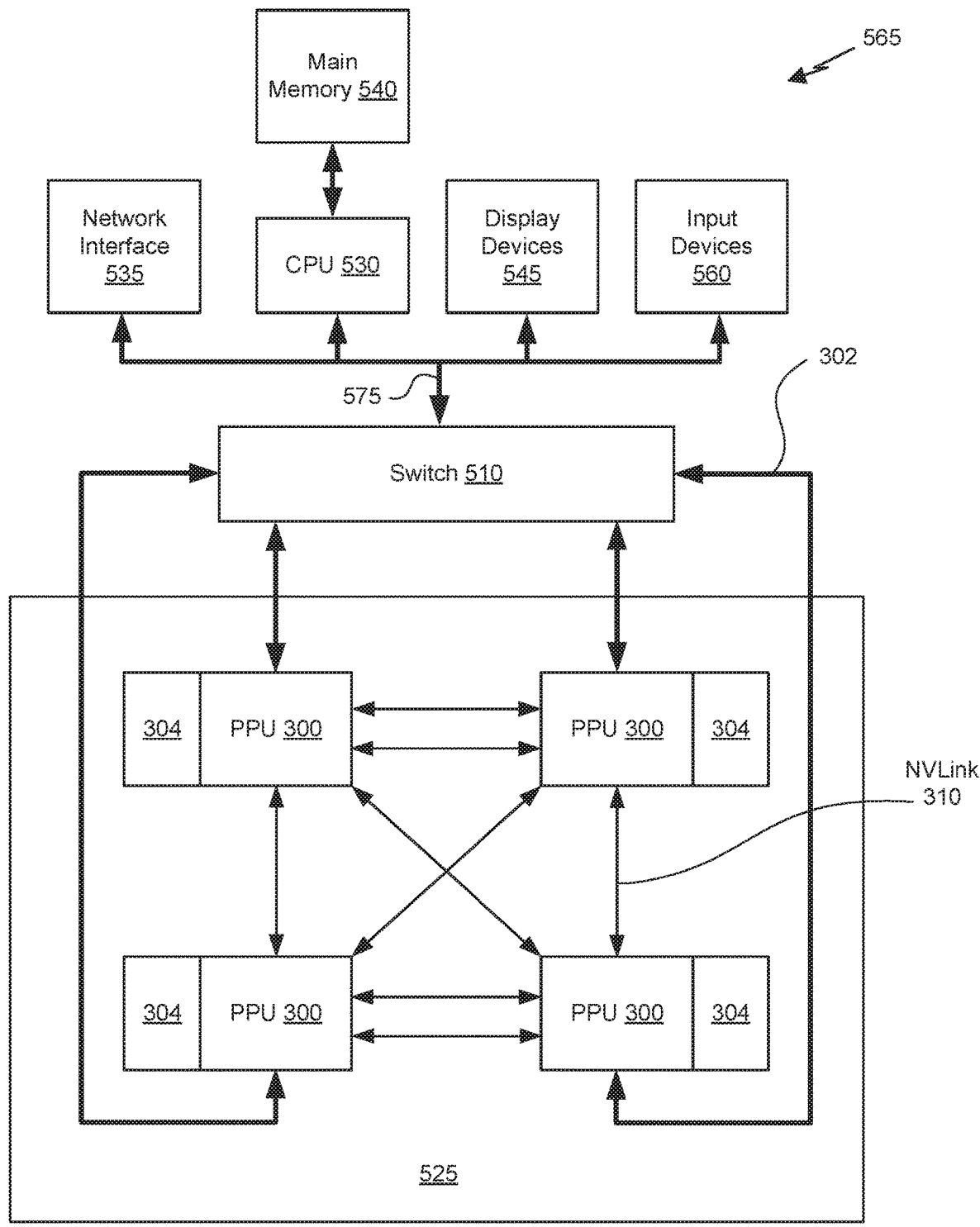
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the method 100 shown in FIG. 1.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, e.g. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, or universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

Plane Detection Network

Figure 6:
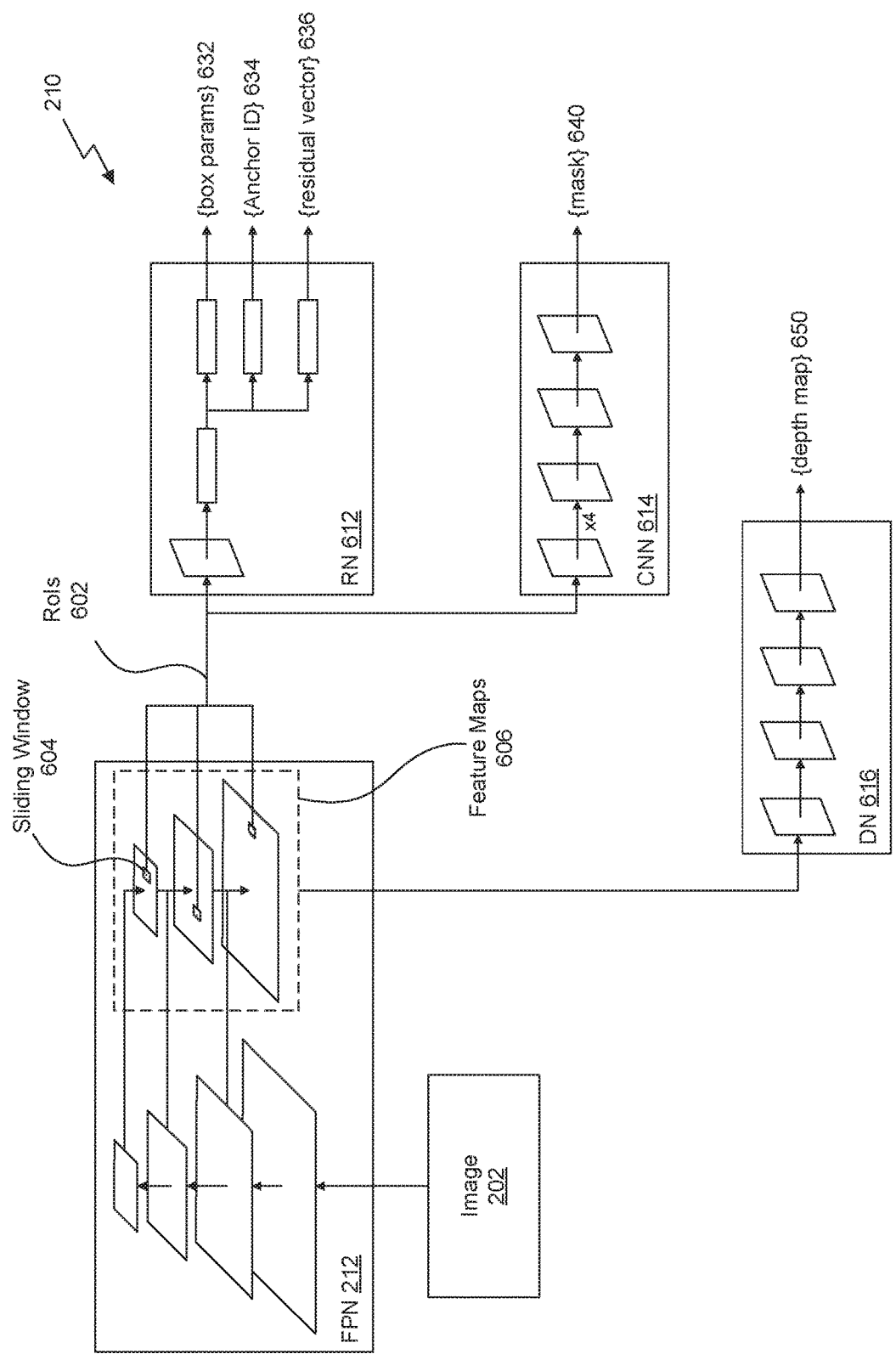
FIG. 6 illustrates the plane detection network of FIG. 2, in accordance with some embodiments.

FIG. 6 illustrates the plane detection network 210 of FIG. 2, in accordance with some embodiments. As depicted in FIG. 6, the plane detection network 210 takes an input image 202 and estimates, for each region of interest (RoI) 602 identified by the FPN 212, bounding box parameters 632 that identify the extents of an object within the RoI, an anchor identifier (ID) 634 identifying one of a plurality of anchor normals, a residual vector 636 that represents the difference between a normal vector for the plane object and the selected anchor normal, and a segmentation mask 640 that identifies whether each pixel within the RoI is part of a particular plane object or part of the background. As used herein, a RoI 602 refers to an anchor bounding box associated with a sliding window 604 applied to one of the feature maps generated by the FPN 212, and each anchor bounding box represents a different scale and aspect ratio for a bounding box centered on the sliding window.

In an embodiment, the FPN 212 is based on a deep CNN such as, but not limited to, a deep residual network. As depicted in FIG. 6, the left side of the FPN 212 comprises a number of convolution stages, each stage comprising a number of convolution layers. The output of each stage comprises a set of feature maps having a particular dimension, in pixel space, which is smaller than the dimension, in pixel space, of the input to the stage. For example, in an embodiment, the FPN 212 is implemented based on a ResNet-50 residual network architecture as defined in He, et al., "Deep Residual Learning for Image Recognition," Computer Vision and Pattern Recognition, Dec. 10, 2015, which is incorporated herein by reference in its entirety. It will be appreciated that, in some embodiments, the FPN 212 can be implemented using other deep residual network architectures, such as ResNet-101.

In an implementation based on the ResNet-50 architecture, for example, the left side of the FPN 212 is implemented as a deep residual neural network that includes five stages. A first stage processes the input image 202 using a single convolution layer that applies a convolution operation to the input using a 7×7 convolution kernel with a stride of 2 to decrease the resolution of the feature maps by half in each dimension of the pixel space. The first stage increases the number of channels of the feature maps from 3 channels at the input to 64 channels at the output of the first stage.

The second stage includes a max pooling layer implementing a 3×3 kernel size and a stride of 2 to reduce the resolution of the features maps by half in each dimension of the pixel space. The max pooling layer is then followed by three separate blocks, each block includes a number of convolution layers and a skip connection that combines (e.g., adds) the input of the block to the output of the last convolution layer in the number of convolution layers. The block is designed as a bottleneck where a first convolution layer in the block applies a convolution operation utilizing a 1×1 convolution kernel that reduces the number of channels in the output to be 64-d (e.g., feature maps include 64 channels), a second convolution layer in the block applies a convolution operation utilizing a 3×3 convolution kernel that also has a 64-d output, and a third convolution layer in the block applies a convolution operation utilizing a 1×1 convolution kernel that increases the number of channels in the output to be 256-d (e.g., feature maps include 256 channels). A skip connection is used to combine the output of the third convolution layer with the input to the block, both the input to the block and the output of the third convolution layer being 256-d. In an embodiment, the resulting feature maps can be processed by an activation function, such as a rectified linear unit (ReLU) or the like. In some embodiments, the output of each layer in the block can be processed by a batch normalization module, a scaling module, and an activation function before passing the set of feature maps to the next layer in the block.

The third stage includes four blocks, each block including a first convolution layer that applies a convolution operation utilizing a 1×1 convolution kernel that reduces the number of channels in the output to be 128-d (e.g., feature maps include 128 channels), a second convolution layer that applies a convolution operation utilizing a 3×3 convolution kernel that also has a 128-d output, and a third convolution layer that applies a convolution operation utilizing a 1×1 convolution kernel that increases the number of channels in the output to be 512-d (e.g., feature maps include 512 channels). The fourth stage includes six blocks, each block including a first convolution layer that applies a convolution operation utilizing a 1×1 convolution kernel that reduces the number of channels in the output to be 256-d (e.g., feature maps include 256 channels), a second convolution layer that applies a convolution operation utilizing a 3×3 convolution kernel that also has a 256-d output, and a third convolution layer that applies a convolution operation utilizing a 1×1 convolution kernel that increases the number of channels in the output to be 1024-d (e.g., feature maps include 1024 channels). Finally, a fifth stage includes three blocks, each block including a first convolution layer that applies a convolution operation utilizing a 1×1 convolution kernel that reduces the number of channels in the output to be 512-d, a second convolution layer that applies a convolution operation utilizing a 3×3 convolution kernel that also has a 512-d output, and a third convolution layer that applies a convolution operation utilizing a 1×1 convolution kernel that increases the number of channels in the output to be 2048-d (e.g., feature maps include 2048 channels).

In an embodiment, the input images 202 are provided with a fixed dimension of 640 pixels×640 pixels. Consequently, the feature maps output by the first stage have dimensions of 320×320×64; the feature maps output by the second stage have dimensions of 160×160×256; the feature maps output by the third stage have dimensions of 80×80×512; the feature maps output by the fourth stage have dimensions of 40×40×1024; and the feature maps output by the fifth stage have dimensions of 20×20×2048. Of course, various embodiments can be configured to process input images 202 of different resolution. In some cases, input images may have a different resolution than required by the FPN 212. In such cases, the input images can be padded with zeros to match the resolution required by the FPN 212. For example, a 640×480 resolution image can be padded with zeros to match a 640×640 resolution. Furthermore, the backbone architecture of the deep residual neural network illustrated by the left side of the FPN 212 can include more or fewer number of stages than described above. In addition, each stage can have a different internal structure including a different arrangement of layers within each block and a different number of blocks. It will also be appreciated that the backbone architecture can be modified to be a deep neural network that is something different than a residual neural network. For example, the backbone architecture can be a CNN having a number of stages, with the output of each stage reducing a resolution of the feature maps output by that stage.

The pyramid of feature maps 606 illustrated by the right side of the FPN 212 includes, at the top level, the feature maps output by the fifth stage of the deep residual neural network. The top-to-bottom pathway of the FPN 212 features a number of stages that increase the spatial resolution of the feature maps 606 at each level of the pyramid. For example, the feature maps at the top level of the pyramid are up-sampled by, for example, a bilinear interpolation layer and then combined with the feature maps output by the fourth stage of the deep residual neural network via a skip link from the backbone architecture of the deep residual neural network illustrated by the left side of the FPN 212. In an embodiment, the feature maps output by the fourth stage of the deep residual neural network are processed by a convolution layer that applies a convolution operation utilizing a 1×1 convolution kernel to change the number of channels in the feature maps output by the fourth stage of the deep residual neural network prior to combining (e.g., concatenating) the feature maps with the feature map from the top level of the pyramid.

The top-to-bottom pathway of the FPN 212 features another stage that up-samples the feature maps at the second level of the pyramid and then combines the up-sampled feature maps with the feature maps output by the third stage of the deep residual neural network via a skip link from the backbone architecture of the deep residual neural network illustrated by the left side of the FPN 212. In an embodiment, the pyramid of feature maps 606 includes multiple layers of the pyramid, each layer of the pyramid including feature maps having a resolution of a particular resolution, the pyramid comprising feature maps having two or more distinct resolutions, in the pixel space.

Importantly, the FPN 212 extracts features from the image 202 at different resolution levels, which enables different RoIs 602 to be defined and analyzed using a sliding window 604 associated with a fixed set of RoIs 602. In conventional RoI pooling, the idea is to apply a max pooling layer to different RoIs of a single feature map, each RoI having arbitrary size and shape, in order to create a fixed-size feature map corresponding to each arbitrary RoI. For example, one RoI might be 49×21 pixels in size and the max pooling layer converts a subset of the feature map corresponding to that RoI into a 7×7 sized feature map. Different predictor heads can then be configured to further process the 7×7 feature maps for each RoI to estimate, e.g., anchor IDs and bounding box regressors for the RoIs.

In contrast to conventional RoI pooling, the pyramid of feature maps 606 and the sliding window 604 can be used to provide corresponding regions of each feature map to the various predictor heads of the PDN 210. More specifically, the sliding window 604 has a fixed size, such as 7×7 pixels, that samples a region of the feature maps to generate a RoI 602. The predictor heads, such as regressor network (RN) 612 and/or CNN 614 are configured to process the 7×7 RoI 602 to estimate parameters for each RoI 602. As used herein, a predictor head refers to a neural network that includes one or more layers such as convolution layers or fully connected layers that process the RoI 602 input to generate an output, such as various plane object parameters.

In an embodiment, the RN 612 implements a number of predictor heads represented by different branches of the RN 612. As depicted in FIG. 6, each of the predictor heads shares at least one layer in the RN 612. For example, the RN 612 can include a convolution layer that is configured to apply a 3×3 convolution operation to the 7×7 feature maps of the RoI 602. The output of the convolution layer is then processed by one or more fully connected layers that calculate a multi-dimensional feature vector (e.g., a 100-d feature vector). The feature vector can then be provided to the input of one or more additional fully connected layers that are implemented by each branch of the RN 612. The fully connected layer(s) of each branch estimate the various parameters associated with the RoI 602.

As depicted in FIG. 6, a first branch of the RN 612 estimates bounding box parameters 632 for each of a plurality of anchor boxes. More specifically, a number (e.g., 9) of anchor bounding boxes are defined relative to the sliding window 604. Each anchor bounding box is associated with an aspect ratio and a scale and, therefore, represents a different sized portion of the image 202 based on the particular feature map level in the pyramid and location of the sliding window 604 that spawned the particular RoI 602. The bounding box parameters 632 include 4 k coordinates estimated by the first branch, each subset of four coordinates corresponding to a different one of the k anchor bounding boxes having a fixed aspect ratio and scale. In an embodiment, the four coordinates for each anchor bounding box include two coordinates that define a translation vector that indicates a 2D translation of the upper left corner of the anchor bounding box and two coordinates that define a change in scale, in both the u and v dimensions, of the anchor bounding box. The bounding box parameters 632 identify the locations of k objects corresponding to the k anchor bounding boxes associated with each RoI 602.

A second branch and third branch of the RN 612 estimate plane normal parameters for each of the potential objects identified by the bounding boxes. The plane normal parameters comprise an anchor ID 634 and a residual vector 636 for each RoI 602. The estimation is similar in nature to the manner of estimating the bounding box parameters for each of the potential objects. More specifically, a number (e.g., 7) of anchor normals are defined and the third branch of the RN 612 is configured to estimate which of the anchor normals is associated with each potential object corresponding to one of the anchor bounding boxes. In other words, the third branch is configured to generate a vector of anchor IDs 634 that correlate each potential object of k objects with a particular anchor normal. The fourth branch of the RN 612 then estimates a set of residual vectors 636, one residual vector per potential object, which each represent a difference between the normal vector for a particular potential object and the anchor normal identified by the corresponding anchor ID generated by the third branch of the RN 612. It will be appreciated that the residual vector added to the anchor normal is sufficient to define a normal vector for the potential object that indicates an orientation of the plane associated with the potential object relative to the camera.

In one embodiment, an anchor ID 634 having a value of 0 indicates that the potential object is classified as "non-planar." Values other than zero are used as an index to one of the defined anchor normal, which provides an inference than the potential object is "planar." In cases where the anchor ID 634 indicates that the potential object is "non-planar," that object can be discarded and not processed by the SRN 220. Consequently, the PDN 210 only passes an arbitrary number of planar objects to the SRN 220 for processing.

Figure 7:
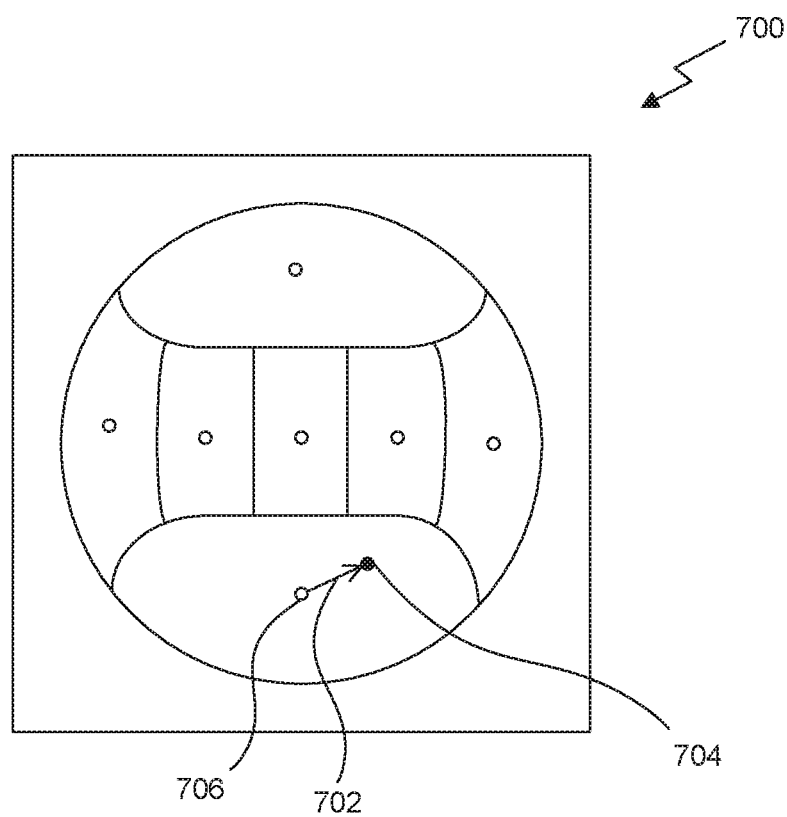
FIG. 7 is a conceptual illustration of the anchor normals, in accordance with some embodiments.

FIG. 7 is a conceptual illustration of the anchor normals, in accordance with some embodiments. The anchor normals refer to a fixed set of normal vectors that define orientations of a plane relative to a camera. In an embodiment, the ground-truth normal vectors are read from a set of training data and a set of anchor normals are calculated from the ground-truth normal vectors. The anchor normal are fixed during training and inferencing. Each normal vector can comprise a three element vector that represents a x-coordinate, a y-coordinate, and a z-coordinate that indicate a direction from an origin of the coordinate system to the point specified by the normal vector coordinates. In an embodiment, each normal vector has a unit length.

In one embodiments, a clustering algorithm (e.g., k-means clustering) is utilized to separate the ground-truth normal vectors into seven distinct clusters. As depicted in the diagram 700, the clusters roughly correspond to a downward-facing orientation, an upward-facing orientation, and five horizontal orientations separated roughly at 45 degrees around a hemisphere centered on the camera. Once the ground-truth normal vectors are divided into the clusters, a mean normal vector for each cluster is calculated and selected as one of the anchor normals. The anchor normals, therefore, represent seven different coarse orientations of plane objects as shown as unfilled circles in diagram 700.

It will be appreciated that the plane objects in any given image do not necessary have a normal vector that is exactly equal to one of the fixed anchor normals. Thus, the predictor heads of the RN 612 estimate a residual vector 702 that represents an offset or difference between the normal vector 704 for a particular plane object and a selected anchor normal 706, as indicated by the estimated anchor ID 634.

Returning now to FIG. 6, it will be appreciated that, in some embodiments, each of the branches of the RN 612 can branch at the output of the convolution layer rather that after the first set of one or more fully connected layers. Furthermore, in yet other embodiments, each of the branches can be implemented as a separate and distinct RN 612. In other words, the branches do not need to share the same output of the convolution layer but can separately implement different convolution layers with different convolution kernel coefficients.

In addition to the parameters estimated by the RN 612 for each RoI 602, a separate and distinct CNN 614 is also implemented to generate a segmentation mask 640 for the RoI 602. The CNN 614 includes a number of convolution layers and/or deconvolution layers. In an embodiment, the 7×7×2048 features associated with the RoI 602 is processed by a first deconvolution layer using a 2×2 filter size with stride 2 to generate a 14×14×256 dimension output. A deconvolution layer refers to a neural network layer configured to perform transposed convolution operations—also called fractionally strided convolutions—that result in up-sampling of the input when the stride is greater than one. The deconvolution layer is followed by four convolution layers, each convolution layer implementing a convolution operation utilizing a 3–3 convolution kernel. The four convolution layers are followed by a second deconvolution layer that generates a 28×28×256 dimension output, which is then followed by a final convolution layer to generate a 28×28×K dimension output. The dimension K can be configured to be equal to the number of anchor bounding boxes defined for the RoI 602 such that each channel of the segmentation mask 640 output corresponds to a segmentation mask for a particular potential object having extents defined by the bounding box parameters 632 for a corresponding anchor bounding box.

In one embodiment, the CNN 614 is executed in parallel with the predictor heads of the RN 612. In such cases, all detected objects are considered plane objects and the PDN 210 will always identify a fixed number of plane objects. In other embodiments, the predictor heads of the RN 612 are executed in a first pass for every RoI across the full feature pyramid output by the FPN 212. The anchor IDs 634 can be used to identify which detected objects are plane objects (e.g., non-zero anchor ID value) and which detected objects are non-planar (e.g., anchor ID value of zero) that can be discarded by the PDN 210. In a second pass, the CNN 614 is then only run on the objects having a non-zero anchor ID 634 value. Discarding certain objects based on the classification of the objects as planar or non-planar enables the PDN 210 to detect an arbitrary number of plane objects in the image 202 and reduces the computational load of the PDN 210 by avoiding the unnecessary execution of the CNN 614 in cases where the detected object has a low confidence score of being planar.

Finally, the m×m segmentation mask 640 for each plane object can be resized to match the size of the original input image 202. In an embodiment, the up-sampling can comprise a nearest neighbor interpolation operation.

The RN 612 and the CNN 614 are similar to the predictor heads and mask branch included in the Mask R-CNN architecture, which is further extended herein to add additional predictor heads to estimate normal vectors for each detected object. The Mask R-CNN architecture is described in He, et al., "Mask R-CNN," Facebook AI Research (FAIR), Jan. 24, 2018, which is incorporated herein by reference in its entirety. The Mask R-CNN framework is further extended to estimate global depth information for the image 202.

Figure 8:
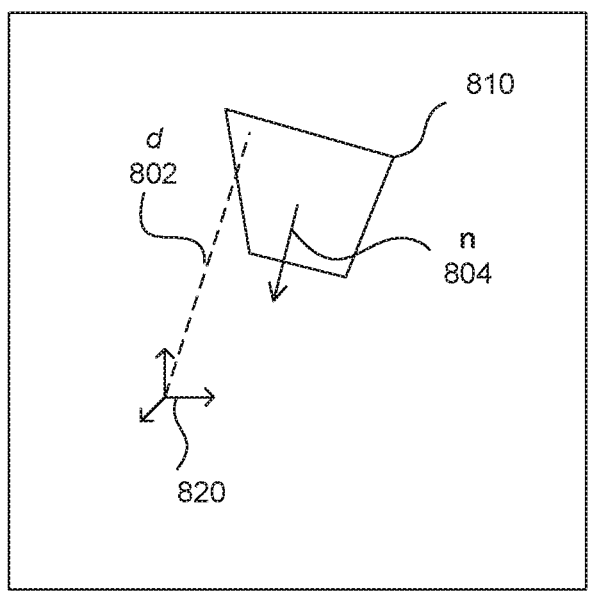
FIG. 8 is a conceptual illustration of the plane offset value, in accordance with some embodiments.

In addition to the plane parameters discussed above, another useful parameter for various applications is a plane offset value. As used herein, the plane offset value refers to a closest distance from an origin of a coordinate system to the plane object, where the origin corresponds to a position of a camera (or virtual camera) that captured the image 202. FIG. 8 is a conceptual illustration of the plane offset value, in accordance with some embodiments. The plane offset value can be calculated according to the following equation:

$$d = \frac{\sum_i m_i (n^T (z_i K^{-1} x_i))}{\sum_i m_i},$$ (Eq. 1)

where K is a 3×3 intrinsic camera matrix, $x_i$ is the ith pixel, $m_i$ is an indicator that is 1 if the ith pixel belongs to the plane object and 0 otherwise, $z_i$ is the predicted depth value of the pixel, and n is the normal vector. In other words, for each pixel in the image that overlaps the plane object, a distance is calculated by taking the dot product of the projected 3D position of the pixel with the normal vector, and then the plane offset is calculated by averaging the sum of those distances over the number of pixels that overlap the plane object.

As depicted in FIG. 8, a plane offset distance, d, 802 representing the distance from a plane object 810 to the origin of a coordinate system 820 is calculated in accordance with Equation 1, given the normal vector, n, 804 and all points on the plane object 810 that are projected onto a pixel $x_i$. It will become apparent to one of skill in the art that a point on the plane object can be determined by projecting the pixel coordinates for pixel $x_i$ into the image to a depth $z_i$ estimated for the plane object 810.

Returning again to FIG. 6, while local image analysis per RoI 602 is sufficient for surface normal prediction and bounding box parameters, global image analysis is needed for accurate depth map inference. Consequently, the PDN 210 also includes a decoder network (DN) 616 for estimating a pixel-wise depth map 650, globally, for the image 202.

In some embodiments, the pixel-wise depth map 650 can be estimated by the DN 616 in parallel with the execution of the RN 612 and/or the CNN 614.

It will be appreciated that the FPN 212 extracts the features of the image 202 at various scales. Hence, the output of the FPN 212 can be exploited as the encoder potion of an encoder/decoder network utilized to estimate a pixel-wise depth map 650 for the image 202. In an embodiment, the PDN 212 further includes a separate DN 616 connected to the output of the FPN 212. The DN 616 is used to expand the features of the image 202 extracted by the FPN 212 in order to generate the pixel-wise depth map 650 for the image 202.

In an embodiment, the structure of the DN 616 is a CNN including a number of stages. The first stage processes the lowest resolution feature map in the feature map pyramid 606 by a first convolution layer that implements a convolution operation using a 3×3 convolution kernel with stride 1, followed by an up-sampling layer, followed by a second convolution layer that implements a convolution operation using a 3×3 convolution kernel with stride 1 in order to generate a feature map at a higher resolution. The output of the first stage is concatenated with the corresponding feature map in the feature map pyramid 606, which is processed by a second stage of the DN 616. The second stage is similar in structure to the first stage, and the number of stages includes additional stages for each additional feature map at higher levels of resolution in the feature map pyramid 606. Once all of the feature maps in the feature map pyramid have been concatenated with the outputs of the stages of the DN 616, a convolution layer that implements a convolution operation utilizing a 3×3 convolution kernel regresses a one-channel depth map. The one-channel depth map 650 can have a lower resolution than the image 202, in accordance with the structure of the FPN 202 and, therefore, in some embodiments, a subsequent up-sampling layer (not shown explicitly) can increase the resolution of the depth map 650 utilizing a bilinear interpolation operation to match the resolution of the image 202.

While the PDN 210 can be utilized to estimate the global depth map and the parameters for each of an arbitrary number of plane objects detected in the image 202, improvements in accuracy can be realized by performing a subsequent refinement step that jointly optimizes the segmentation masks 640 for each RoI 602 before combining the refined segmentation masks in order to generate a global segmentation mask for the image 202.

Segmentation Refinement Network

Figure 9A:
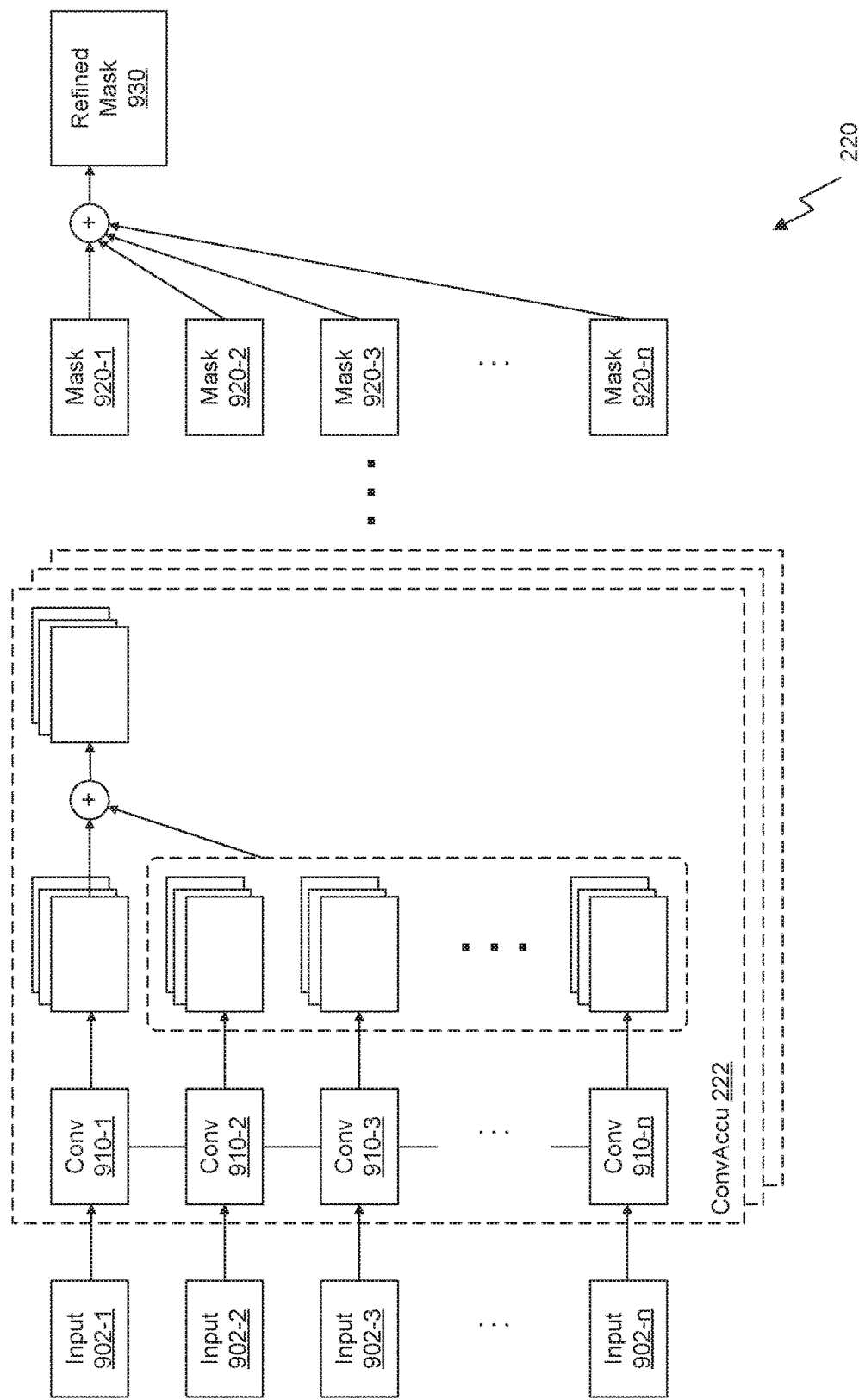
FIGS. 9A-9B illustrate a segmentation refinement network, in accordance with some embodiments.
Figure 9B:
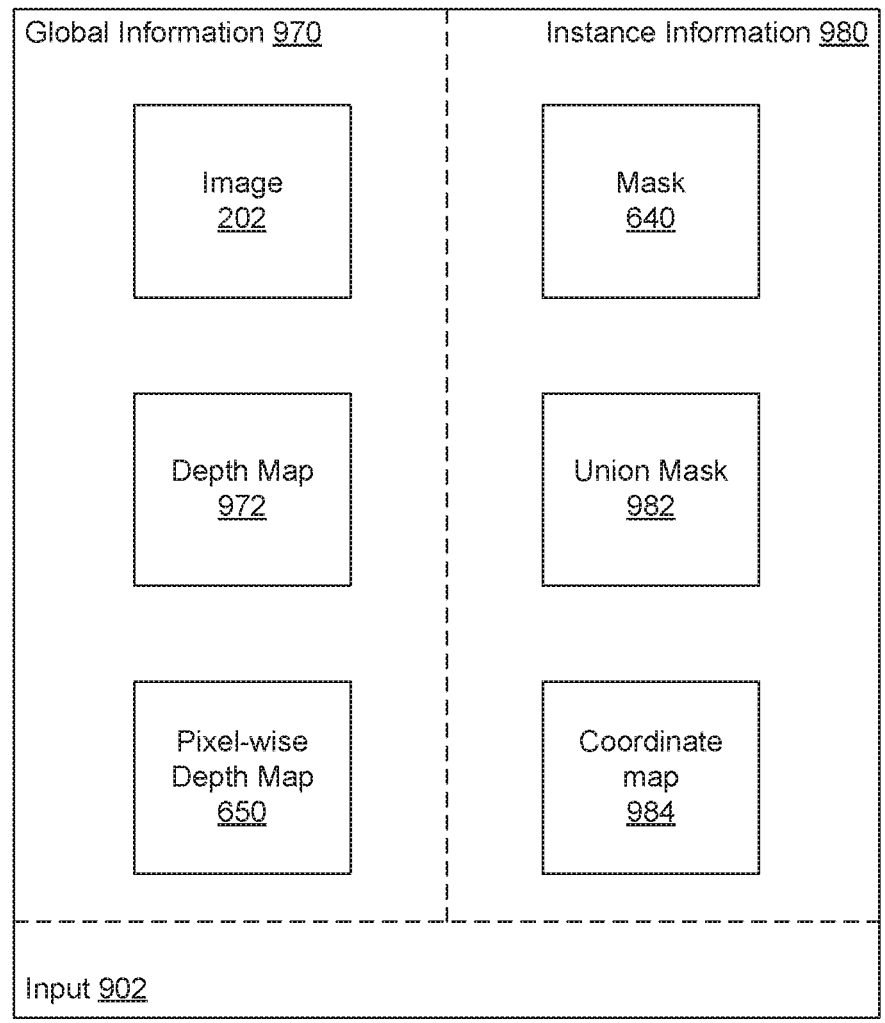

FIGS. 9A-9B illustrate a segmentation refinement network 220, in accordance with some embodiments. The segmentation refinement network 220 jointly optimizes all of the segmentation masks 640. It will be appreciated that one major challenge when implementing the segmentation refinement network 220 is that the PDN 210 detects an arbitrary number of plane objects 810 and, therefore, the segmentation refinement network 220 must be configured to accept a variable number of inputs 902 corresponding to the instances of the plane objects 810 detected by the PDN 210. One naïve solution is to configure the segmentation refinement network 220 to assume that the number of inputs 902 includes the maximum number of plane objects 810 that can be detected by the PDN 210 and pad the input 902 for any missing plane objects 810 with zero-valued inputs. However, this solution does not scale well to a large number of plane objects 810 and is prone to missing small plane objects 810.

A different solution is proposed where separate instances of a convolution layer process a corresponding input 902 associated with a plane object 810 to produce a feature volume for that particular plane object 810. An accumulation operation then concatenates the feature volume for that particular plane object 810 with a mean feature volume for all of the other plane objects 810 produced by corresponding instances of the convolution layer implemented for the different plane objects 810 at the same layer of the neural network. This concatenated feature volume is then passed to the next layer of the neural network.

As depicted in FIG. 9A, a convolution/accumulation (ConvAccu) module 222 is defined for implementing conventional convolution layers of a neural network. In an embodiment, the neural network is a U-Net with skip connections and the ConvAccu module 222 is utilized to implement each convolution layer of the U-Net architecture. The neural network includes multiple instances of the ConvAccu module 222 for each convolution layer of the neural network, one instance of the ConvAccu module 222 for each distinct plane object 810 detected by the PDN 210. In addition, the neural network can includes separate sets of instances of the ConvAccu module 222 for each convolution layer in the traditional U-Net.

In an embodiment as depicted in FIG. 9B, for each detected plane object 810 generated by the PDN 210, the input 902 to the first layer of the neural network includes both global information 970 and instance-specific information 980. The global information 970 is shared among all instances of the plane objects 810 and can include the input image 202, the depth map 972, and a pixel-wise depth map 650. The depth map 972 is reconstructed based on the segmentation masks and the plane parameters for the plane objects estimated by the PDN 210 such that the depth changes smoothly within each plane object 810. In contrast, the pixel-wise depth map 650 is estimated by the DN 616 of the PDN 210 such that the depth of each pixel is estimated independently based on the features of the image. The instance-specific information 980 includes the segmentation mask 640 for the plane object 810, the union mask 982 of all of the other segmentation masks 640 for all of the other plane objects 810 in the image 202, and a coordinate map 984 that encodes a 3D coordinate for each of the pixels calculated according to a plane equation for the plane object 810.

Returning now to FIG. 9A, once the inputs 902 are processed by one or more subsequent layers of the neural network, the output of the last set of ConvAccu modules 222 is a refined mask 920 for each instance of the plane objects 810 detected by the PDN 210. The refined masks 920 are concatenated to generate a refined segmentation mask 930 for the image 202.

Although not shown explicitly in FIG. 9A, training of the neural network can be performed by comparing the refined segmentation mask 930 against a ground-truth target mask using a cross-entropy loss function.

Figure 10:
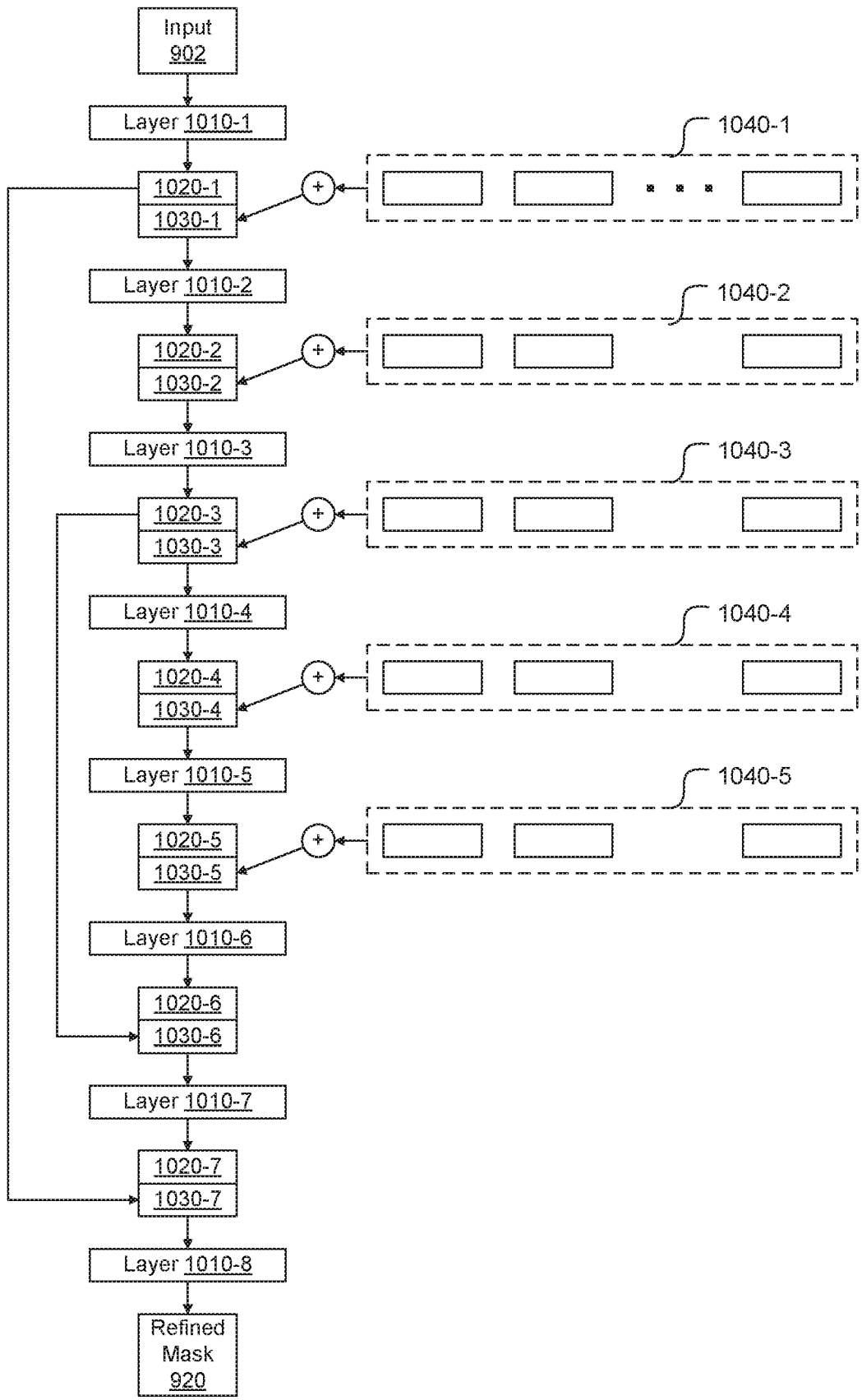
FIG. 10 illustrates a neural network architecture for the segmentation refinement network, in accordance with some embodiments.

FIG. 10 illustrates a neural network architecture for the segmentation refinement network 220, in accordance with some embodiments. As depicted in FIG. 10, the neural network architecture can be implemented as a U-net with skip links that are used to forward feature maps output by stages of the encoder section of the neural network to be concatenated with feature maps input to corresponding stages of the decoder section of the neural network. The structure illustrated in FIG. 10 is only one portion of the neural network architecture corresponding to a particular instance of a detected plane object 810. This structure is repeated for each of the other plane objects 810 detected by the PDN 210. The structure shown in FIG. 10 also omits a final layer of the neural network that combines the refined masks 920 for each of the instances of the detected plane objects 810 to generate a combined segmentation mask for the image 202.

In an embodiment, the input 902 for a particular plane object 810 is passed to a first layer 1010-1, which generates a feature map 1020-1 for that particular plane object 810. The feature map 1020-1 is then combined with a mean feature map 1040-1 that is an average of all of the corresponding feature maps 1020 output by separate instances of the corresponding first layers 1010-1 for each of the other plane objects 810 to generate the combined input 1030-1 for the next layer 1010-2 of the neural network. In one embodiment, the first layer 1010-1 implements a convolution operation utilizing a 3×3 convolution kernel and a stride of 1. The feature map 1020-1 output by the first layer 1010-1 can have dimensions of 256×192×32.

The combined input 1030-1 is processed by a second layer 1010-2, which generates a feature map 1020-2. The feature map 1020-2 is then combined with a mean feature map 1040-2 that is an average of all of the corresponding feature maps 1020 output by separate instances of the corresponding second layers 1010-2 for each of the other plane objects 810 to generate the combined input 1030-2 for the next layer 1010-3 of the neural network. In one embodiment, the second layer 1010-2 implements a convolution operation utilizing a 3×3 convolution kernel and a stride of 2. The feature map 1020-2 output by the second layer 1010-2 can have dimensions of 128×96×64.

The third layer 1010-3 and fourth layer 1010-4 are similar to the first layer 1010-1 and the second layer 1010-2 and also implement convolution operations utilizing 3×3 convolution kernels. The third layer 1010-3 utilizes a stride of 1, and the fourth layer 1010-4 utilizes a stride of 2. Consequently, the feature map 1020-3 output by the third layer 1010-3 can have dimensions of 128×96×64, and the feature map 1020-4 output by the fourth layer 1010-4 can have dimensions of 64×48×128.

The fifth layer 1010-5, the sixth layer 1010-6, the seventh layer 1010-7, and the eighth layer 1010-8 represent the decoder section of the neural network. The fifth layer 1010-5 implements a convolution operation utilizing a 3×3 convolution kernel and a stride of 1. Consequently, the feature map 1020-5 output by the fifth layer 1010-5 can have dimensions of 64×48×128.

The sixth layer 1010-6 implements a deconvolution operation (e.g., a transposed convolution) utilizing a 4×4 convolution kernel and a stride of 2. The sixth layer 1010-6 expands the spatial resolution, in pixel space, of the feature map 1030-5 to generate a feature map 1020-6 output by the sixth layer 1010-6 that can have dimensions of 128×96×64. In an embodiment, the feature map 1020-6 is not combined with a mean feature map 1040 like the previous layers of the neural network. Instead, the feature map 1020-6 is combined with the feature map 1020-3 output by the third layer 1010-3 via the skip link.

The seventh layer 1010-7 implements a deconvolution operation utilizing a 4×4 convolution kernel and a stride of 2. The seventh layer 1010-7 expands the spatial resolution, in pixel space, of the feature map 1030-6 to generate a feature map 1020-7 output by the seventh layer 1010-7 that can have dimensions of 256×192×32. In an embodiment, the feature map 1020-7 is combined with the feature map 1020-1 output by the first layer 1010-1 via the skip link.

Finally, the eighth layer 1010-8 of the neural network implements a convolution operation utilizing a 3×3 convolution kernel and a stride of 1 to generate the refined mask 920 for the particular plane object 810. It will be appreciated that the structure of the neural network shown in FIG. 10 is simply one exemplary embodiment of the U-Net architecture and that other embodiments can include a different arrangement or number of convolution or deconvolution layers, skip links, and the like. Furthermore, each block (e.g., a convolution layer followed by the concatenation of the feature map output by the convolution layer with the mean feature map for other plane objects) of the neural network architecture shown in FIG. 10 can be implemented by the ConvAccu module 222 described in FIG. 9A.

Figure 11:
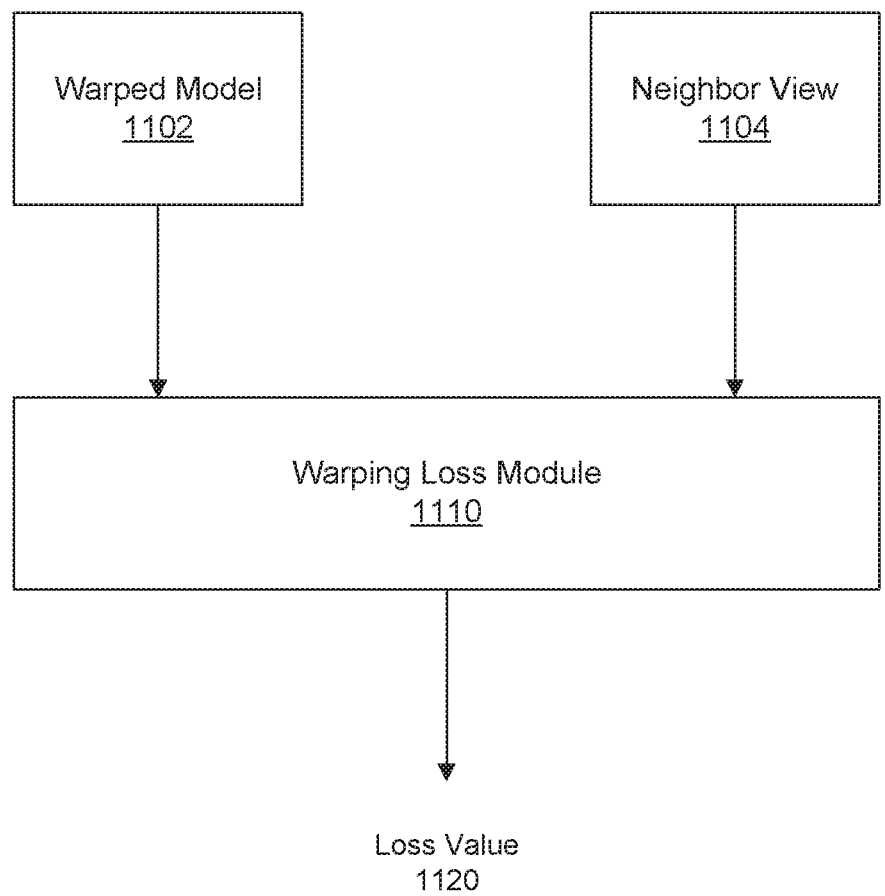
FIG. 11 illustrates a warping loss module utilized during training of the neural networks, in accordance with some embodiments.

FIG. 11 illustrates a warping loss module 1110 utilized during training of the neural networks, in accordance with some embodiments. As depicted in FIG. 11, the warping loss module 1110 receives a warped model 1102 and a neighbor view 1104 as input and generates a loss values 1120. The loss value 1120 can be back-propagated through the SRN 210 and the PDN 220.

In an embodiment, the warping loss module 1110 implements an unprojection, a coordinate frame transformation, and a projection. Given a set of intrinsic parameters for a camera, K, the warping loss module 1110 can be configured to unproject the pixels ($u^n$, $v^n$) in the neighbor view 1104 according to the following equation:

$$X^n = K^{-1} h(u^n, v^n) \hat{D}^n(u^n, v^n),\qquad\text{(Eq. 2)}$$

where $\hat{D}^n$ is the ground-truth depth map for the neighbor view 1104 and h converts the pixel ($u^n$, $v^n$) in the neighbor view 1104 to a homogenous representation. The unprojected pixels are then transformed to the current view for the warped model 1102 using a rotation R and translation t, in accordance with the following Equation:

$$X^c = RX^n + t \qquad\text{(Eq. 3)}$$

Finally, the warping loss module 1110 generates the warped pixel coordinates ($u^w$, $v^w$) by the projection:

$$(u^w, v^w) = h^{-1}(KX^c),\qquad\text{(Eq. 4)}$$

where $h^{-1}$ converts the homogenous coordinates back to a 2D representation. The warped pixel coordinates ($u^w$, $v^w$) are then used to sample a depth value from the depth map of the current view and calculate the loss function between the sampled depth values using the warped pixel coordinates and the ground-truth depth map for the neighbor view 1104.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A system for detecting three-dimensional (3D) planes from monocular, two-dimensional (2D) images, the system comprising:

a feature pyramid network configured to generate a pyramid of feature maps for an input image; and one or more neural networks configured to process regions of interest sampled from the pyramid of feature maps to identify a number of plane objects in the input image, wherein the one or more neural networks are configured to estimate parameters for each plane object in the number of plane objects, the parameters including bounding box parameters, plane normal parameters, and a segmentation mask.

2. The system of claim 1, wherein the pyramid of feature maps includes a number of levels associated with a number of different scales.

3. The system of claim 1, wherein the bounding box parameters define a bounding box that indicates a location of the plane object, and wherein the plane normal parameters indicate a relative orientation of the plane object.

4. The system of claim 1, wherein, for each plane object in the number of plane objects, a plane offset parameter is calculated based on a normal vector estimated for the plane object and a depth map, and wherein a decoder network included in the one or more neural networks is configured to process the pyramid of feature maps to estimate the depth map.

5. The system of claim 1, wherein the one or more neural networks includes a regressor network configured to estimate the bounding box parameters for at least one plane object associated with a region of interest within a particular feature map associated with a particular level of the pyramid of feature maps.

6. The system of claim 5, wherein the regressor network is further configured to estimate the plane normal parameters for the at least one plane object associated with the region of interest.

7. The system of claim 1, wherein the one or more neural networks includes a convolutional neural network (CNN) configured to process at least one region of interest to generate segmentation masks.

8. The system of claim 1, wherein the feature pyramid network is implemented, at least in part, on a parallel processing unit.

9. The system of claim 8, wherein the one or more neural networks are implemented, at least in part, on the parallel processing unit.

10. The system of claim 1, further comprising a segmentation refinement network configured to generate a refined segmentation mask for the input image based on the segmentation mask for each plane object included in the number of plane objects, wherein an input to at least one layer of the segmentation refinement network includes a feature map associated with a particular plane object and a mean feature map calculated based on an element-wise average of the feature maps for each of the other plane objects in the number of plane objects.

11. The system of claim 1, further comprising a warping loss module that is configured to adjust attributes of the one or more neural networks by comparing a reconstructed 3D coordinate map for the input image with a warped 3D coordinate map for a neighbor image.

12. A computer-implemented method for detecting planar objects in an image, the method comprising:

generating, via a feature pyramid network, a pyramid of feature maps based on an input image;

processing, via one or more neural networks, regions of interest sampled from the pyramid of feature maps to identify a number of plane objects in the input image;

wherein the one or more neural networks are configured to estimate parameters for each plane object in the number of plane objects, the parameters including bounding box parameters, plane normal parameters, and a segmentation mask.

13. The method of claim 12, wherein the pyramid of feature maps includes a number of levels associated with a number of different scales.

14. The method of claim 12, wherein the bounding box parameters define a bounding box that indicates a location of the plane object, and wherein the plane normal parameters indicate a relative orientation of the plane object.

15. The method of claim 12, further comprising:

calculating a plane offset parameter for each plane object in the number of plane objects based on a normal vector estimated for each plane object and a depth map, wherein a decoder network included in the one or more neural networks is configured to process the pyramid of feature maps to estimate the depth map.

16. The method of claim 12, wherein a regressor network is configured to estimate the bounding box parameters by processing a region of interest to generate a four-element vector that represents a location of a vertex of a bounding box and a size of the bounding box for each of a plurality of anchor boxes associated with the region of interest.

17. The method of claim 16, wherein the regressor network is further configured to estimate the plane normal parameters by processing the region of interest to generate an anchor identifier and a three-element vector that represents a residual vector corresponding to an anchor normal associated with the anchor identifier.

18. The method of claim 12, wherein at least one of the feature pyramid network or the one or more neural networks are implemented, at least in part, by executing a convolution operation on a parallel processing unit.

19. The method of claim 12, the method further comprising:

generating, via a segmentation refinement network, a refined segmentation mask for the input image based on the segmentation mask for each plane object included in the number of plane objects, wherein an input to at least one layer of the segmentation refinement network includes a feature map associated with a particular plane object and a mean feature map calculated based on an element-wise average of the feature maps for each of the other plane objects in the number of plane objects.

20. The method of claim 12, the method further comprising:

adjusting, via a warping loss module, attributes of the one or more neural networks by comparing a reconstructed 3D coordinate map for the image with a warped 3D coordinate map for a neighbor image.

21. A system configured to implement a neural network framework for plane object detection, the system comprising:

a feature pyramid network configured to process an image to generate a plurality of feature maps associated with the image and generate samples for a plurality of regions of interest from the plurality of feature maps, wherein the plurality of feature maps includes at least two feature maps having different resolutions, in a pixel space;

a regressor network configured to process the samples for each region of interest to identify zero or more plane objects in each region, wherein the regressor network is configured to estimate bounding box parameters and plane normal parameters for each plane object in the zero or more plane objects;

a convolutional neural network configured to estimate a segmentation map for each plane object identified by the regressor network; and a decoder network configured to estimate a depth map corresponding to the image based on the plurality of feature maps.

22. The system of claim 21, the system further comprising:

a segmentation refinement network configured to generate a refined segmentation mask for the input image based on the segmentation mask for each plane object included in the number of plane objects, wherein an input to at least one layer of the segmentation refinement network includes a feature map associated with a particular plane object and a mean feature map calculated based on an element-wise average of the feature maps for each of the other plane objects in the number of plane objects.

23. The system of claim 21, the system further comprising:

a warping loss module configured to train the neural network architecture by comparing a reconstructed coordinate map for the image with a warped coordinate map for a neighbor image.

24. The system of claim 23, wherein the image and the neighbor image are included in a sequence of video frames, wherein the neighbor image precedes the image in the sequence of video frames, and wherein there is at least one intervening video frame between the image and the neighbor image.

* * * * *